(12) United States Patent
Kojima et al.

(10) Patent No.: US 9,229,772 B2
(45) Date of Patent: Jan. 5, 2016

(54) PROGRESS STATUS MANAGEMENT SYSTEM AND PROGRESS STATUS MANAGEMENT METHOD

(75) Inventors: Go Kojima, Tokyo (JP); Yohsuke Ishii, Tokyo (JP); Shoji Kodama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/406,853

(22) PCT Filed: Jun. 14, 2012

(86) PCT No.: PCT/JP2012/065214
§ 371 (c)(1),
(2), (4) Date: Jan. 7, 2015

(87) PCT Pub. No.: WO2013/186891
PCT Pub. Date: Dec. 19, 2013

(65) Prior Publication Data
US 2015/0186182 A1    Jul. 2, 2015

(51) Int. Cl.
*G06F 3/00* (2006.01)
*G06F 9/44* (2006.01)
*G06F 9/46* (2006.01)
*G06F 13/00* (2006.01)
*G06F 9/48* (2006.01)
*G06Q 10/06* (2012.01)

(52) U.S. Cl.
CPC ............ *G06F 9/4843* (2013.01); *G06F 9/4881* (2013.01); *G06Q 10/06* (2013.01)

(58) Field of Classification Search
None
See application file for complete search history.

(56) References Cited

U.S. PATENT DOCUMENTS

| 6,807,575 B1 * | 10/2004 | Emaru ............... G06F 11/3419 709/203 |
| 2006/0010024 A1 * | 1/2006 | Eguchi ........... G06Q 10/063114 705/7.15 |
| 2007/0245344 A1 | 10/2007 | Kumagai et al. |

FOREIGN PATENT DOCUMENTS

| JP | 7-230512 | 8/1995 |
| JP | 2006-126986 A | 5/2006 |
| JP | 2007-213344 A | 8/2007 |
| JP | 2009-037309 A | 2/2009 |

(Continued)

OTHER PUBLICATIONS

PCT International Search Report and Written Opinion on application PCT/JP2012/065214 mailed Sep. 18, 2012 (6 pages) with translation of International Search Report.

(Continued)

*Primary Examiner* — Craig Dorais
(74) *Attorney, Agent, or Firm* — Foley & Lardner LLP

(57) ABSTRACT

A progress status management system comprises a management target system configured to execute a series of processes to the file, which includes a plurality of process units configured to execute a process to a file, and a progress status management unit configured to manage a progress status of a process executed by the process unit included at the management target system. The progress status management unit, in a case of acquiring the first identification information of a file in a first process unit, acquires the first identification information of the file in the second process unit, and links the acquired first identification information in the first process unit and the acquired first identification information in the second process unit to the same second identification information.

14 Claims, 17 Drawing Sheets

(56) References Cited

FOREIGN PATENT DOCUMENTS

| | | |
|---|---|---|
| JP | 2010-073014 A | 4/2010 |
| JP | 2011-243128 A | 12/2011 |

OTHER PUBLICATIONS

Japan Patent Office action on application 2014-521055 mailed Jul. 7, 2015; 11 pages (with partial English translation).

* cited by examiner

| 4001 | 4002 | 4003 |
|---|---|---|
| FILE ID | STATUS | TIME AND DATE |
| 0001 | UNCOLLECTED | 2012/02/01 12:00:30 |

| 5001 | 5002 | 5003 |
|---|---|---|
| GLOBAL FILE ID | COMPONENT ID | FILE ID |
| 000003 | TEXT SEARCH SYSTEM | 0001 |
| 000003 | FILE STORAGE | /dcm/20120202a.dcm |

| GLOBAL FILE ID (6001) | COMPONENT ID (6002) | STATUS (6003) | TIME AND DATE (6004) |
|---|---|---|---|
| 000001 | MEDICAL IMAGE ADAPTER | REGISTRATION COMPLETE | 2012/02/01 12:00:00 |
| 000001 | ELECTRONIC MEDICAL RECORD ADAPTER | REGISTRATION COMPLETE | 2012/02/01 12:00:01 |
| 000001 | METADATA EXTRACTION-FILE REGISTRATION SYSTEM | REGISTRATION COMPLETE | 2012/02/01 12:00:05 |
| 000001 | TEXT SEARCH SYSTEM | REGISTRATION COMPLETE | 2012/02/01 12:00:12 |
| 000001 | METADATA DATABASE | REGISTRATION COMPLETE | 2012/02/01 12:00:14 |
| 000002 | MEDICAL IMAGE ADAPTER | REGISTRATION COMPLETE | 2012/02/01 12:00:15 |
| 000002 | ELECTRONIC MEDICAL RECORD ADAPTER | REGISTRATION COMPLETE | 2012/02/01 12:00:16 |
| 000002 | METADATA EXTRACTION-FILE REGISTRATION SYSTEM | REGISTRATION COMPLETE | 2012/02/01 12:00:17 |
| 000002 | TEXT SEARCH SYSTEM | REGISTRATION COMPLETE | 2012/02/01 12:00:18 |
| 000002 | METADATA DATABASE | UNCOLLECTED | 2012/02/01 12:00:20 |
| 000003 | MEDICAL IMAGE ADAPTER | REGISTRATION COMPLETE | 2012/02/01 12:00:21 |
| 000003 | ELECTRONIC MEDICAL RECORD ADAPTER | REGISTRATION COMPLETE | 2012/02/01 12:00:22 |
| 000003 | METADATA EXTRACTION-FILE REGISTRATION SYSTEM | REGISTRATION COMPLETE | 2012/02/01 12:00:24 |
| 000003 | TEXT SEARCH SYSTEM | UNCOLLECTED | 2012/02/01 12:00:30 |

FIG. 7

| FILE NAME | STATUS | |
|---|---|---|
| GO_KOJIMA.hl7 | USABLE | |
| SHOJI_KODAMA.hl7 | REGISTRATION ONGOING (IN 10 MINUTES) | PRIORITY REGISTRATION |
| NOBUMITSU_TAKAOKA.hl7 | REGISTRATION ONGOING (IN 12 MINUTES) | PRIORITY REGISTRATION |
| MICAEL_HAY.hl7 | REGISTRATION ONGOING (IN 1 HOUR) | PRIORITY REGISTRATION |

CATEGORY  PATIENT INFORMATION
DATE CREATED  2  DAYS  PRIOR

66%  REMAINING: 3 FILES
ESTIMATED END TIME: 1 HOUR

*FIG. 16*

PROGRESS STATUS MANAGEMENT SYSTEM AND PROGRESS STATUS MANAGEMENT METHOD

BACKGROUND

The present invention relates to a progress status management system configured to manage the progress status of a process executed to a file by multiple process units, and more particularly to a progress status management system configured to manage the progress status even when each process unit includes its own unique identification information to the same file.

The amount of unstructured data used in companies is on the rise. The demand for using such data is increasing as there are more occasions where multiple systems requiring file registration such as a test search system are utilized. For example, in order to utilize the test search system, the test search system is required to collect files that are search target and execute a process to generate a search index for the collected files. However, the execution time for the file collection process and the execution time for the search index generation process vary depending on the amount of files. Accordingly, since the execution time for these processes are unknown, a user of such system will have a problem (hereinafter referred to as "problem 1") in that the user is not able to grasp when files become searchable.

In order to solve the problem 1, many test search systems are equipped with a feature to display the progress status of the file collection process and/or the search index generation process. By this a user is able to grasp when and which file will become available.

Further, when building a system for the purpose of utilizing files, it is required to realize a process flow by combining multiple components (process units) configured to execute processes to the files. However, in such case, there lies a problem (hereinafter referred to as "problem 2") in that it is difficult to grasp the process flow.

In order to solve the problem 2, Japanese Patent Publication No. 2006-126986 (Patent Document 1) has been offered. In this gazette, there is a description (refer to Abstract) "On the assumption that costs required for each activity are all equal, a progress rate is calculated from the number of residual activities to nodes and a path under execution by an active path. As for the calculation method of the progress rate, a progress rate St+1 is calculated by dividing a residual progress rate (100-St) by the total number of activities which are likely to propagate, and adding the result to the current progress rate St." According to this, a user is able to grasp the process flow and the process time for the entire system even when the system includes a combination of multiple components.

[Patent Document 1] Japanese Patent Publication No. 2006-126986

SUMMARY

According to prior art, a user is able to grasp the progress of a process executed by a system having a single component such as a test search system, and grasp the process flow for each job executed by a system having a combination of multiple components. However, when a file needs to be executed across multiple components, there lies a problem that it is not possible to grasp the progress status for each file being processed.

In view of these problems, the purpose of the present invention is provide a progress status management system operable to manage the progress status for each file being processed when files need to be processed across multiple process units.

The representative one of inventions disclosed in this application is outlined as follows. There is provided a progress status management system comprising a management target system configured to execute a series of processes to a file, which includes a plurality of process units configured to execute a process to the file, and a progress status management unit configured to manage a progress status of a process executed by the process unit included at the management target system, wherein the progress status management system stores process flow information registering therein a process order of the process units to execute a process to the file, wherein the progress status management unit includes: an identification information linking unit configured to link first identification information, which is identification information of the file in the process unit, and second identification information, which is identification information of the file unique in the management target system, and store the linked identification information at identification information linking information; a progress information collection unit configured to collect progress information including a progress status of a process executed by the process unit and the first identification information of the processed file in the process unit executing the process; and a progress status linking unit configured to refer to the identification information linking information, identify the second identification information linked to the first identification information of progress information collected by the progress information collection unit, link the identified second identification information to a progress status of the progress information collected by the progress information collection unit, and store the second identification information and the linked progress status as progress accumulation information, wherein the plurality of process units include a first process unit and a second process unit, wherein the identification information linking unit, in a case of acquiring the first identification information of a file in the first process unit, acquires the first identification information of the file in the second process unit, and wherein the identification information linking unit links the acquired first identification information in the first process unit and the acquired first identification information in the second process unit to the same second identification information.

According to an embodiment of this invention, it is possible to provide the progress status management system operable to manage the progress status for each file being processed when files need to be processed across multiple process units.

BRIEF DESCRIPTION OF THE DRAWINGS

The present invention can be appreciated by the description which follows in conjunction with the following figures, wherein:

FIG. 7 is an explanatory diagram of progress accumulation information according to the first embodiment of the present invention;

FIG. 16 is an explanatory diagram of a priority modification screen according to the second embodiment of the present invention;

DETAILED DESCRIPTION OF THE EMBODIMENTS

First Embodiment

Hereinafter a first embodiment of the present invention will be described with reference to FIG. 1 through FIG. 4.

Figure 1:
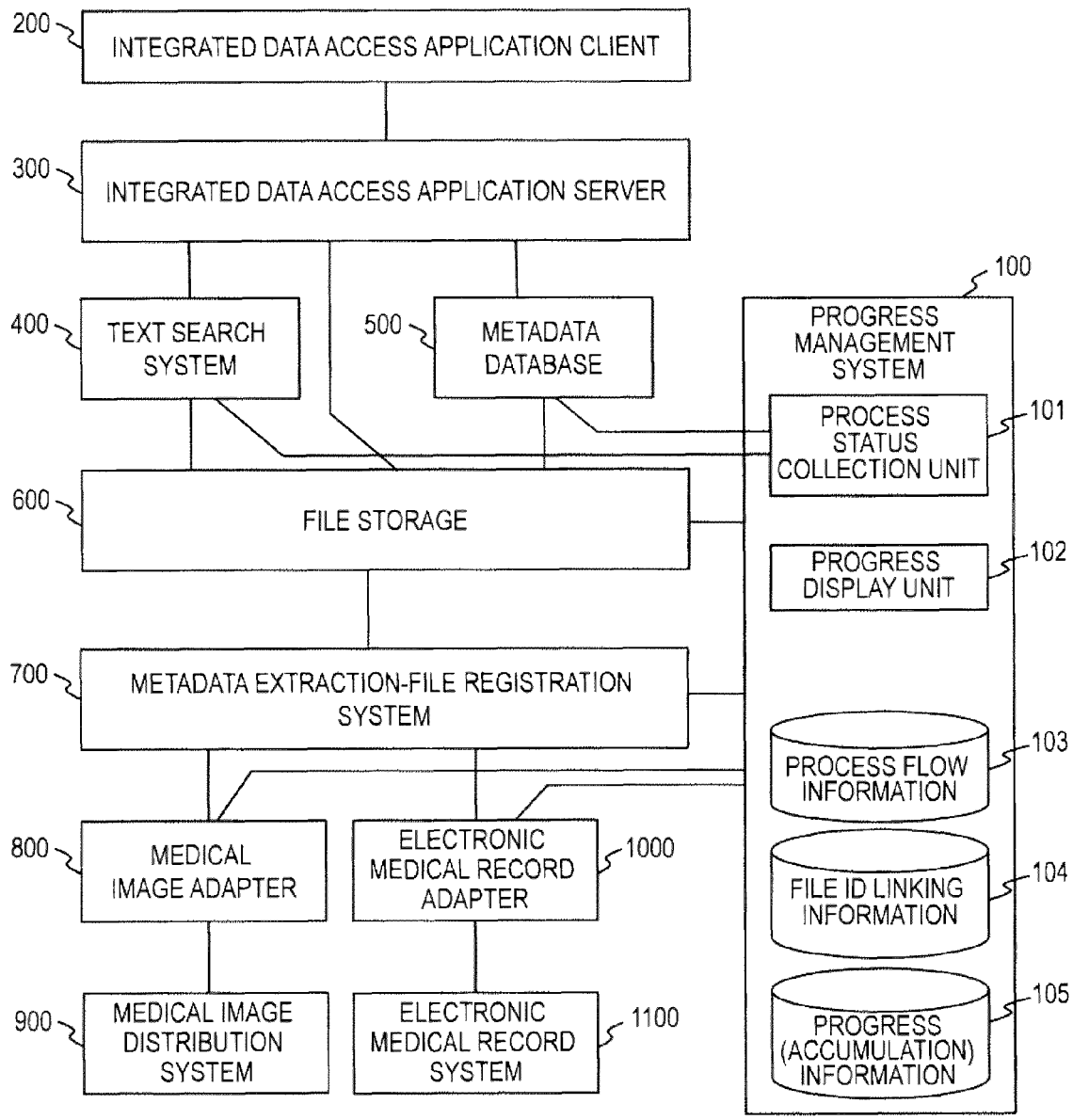
FIG. 1 is an explanatory diagram of a configuration of an information process system according to a first embodiment of a present invention.

FIG. 1 is an explanatory diagram of a configuration of an information process system according to the first embodiment of the present invention. The information process system includes a progress management system 100, an integrated data access application client 200, an integrated data access application server 300, a test search system 400, a metadata database 500, a file storage 600, a metadata extraction—file registration system 700, a medical image adapter 800, a medical image distribution system 900, an electronic medical record adapter 1000, and an electronic medical record system 1100. Note that these elements include a hardware apparatus having a similar configuration as that of a server apparatus commonly used in various environments.

The configuration of the hardware apparatus will be described in detail with reference to the progress management system 100 and FIG. 2.

In the present embodiment, in order to describe the operation of the progress management system 100 which forms the functional elements comprising the essence of the present invention an exemplary case of applying the progress management system 100 to a medical information system will be described. However, the progress management system 100 may be applied to other systems.

Before describing the details concerning to the process order of the progress management system 100, an outline of the configuration of a medical information system will be described.

The medical information system of the present embodiment includes the integrated data access application server 300, the test search system 400, the metadata database 500, the file storage 600, the metadata extraction—file registration system 700, the medical record adapter 800, the medical image distribution system 900, the electronic medical record adapter 1000, and the electronic medical record system 1100.

The medical image distribution system 900 is a system configured to process medical images such as X-ray images and MRI images, or the like, while the electronic medical record system 1100 is a system configured to process electronic medical records. The medical information system according to the present embodiment aggregates and stores the medical images and the electronic medical records at the file storage 600. The metadata database 500 aggregates and manages the metadata of the medical images and the electronic medical records (e.g., patient ID, date, time, and test ID, or the like). Further, the test search system 400 allows the medical images and the electronic medical records stored at the file storage 600 to be searchable via the test thereof. Then, the integrated data access application server 300 accesses the test search system 400 and the metadata database 500 in order to realize an integrated search function which combines the test search function of the test search system 400 and the filter search function by the metadata database 500.

A user of the medical information system according to the present embodiment is able to use the integrated data access application client 200 to connect to the integrated data access application server 300 and use the integrated search functions provided by the integrated data access application server 300.

The essential aspect of the medical information system according to the present embodiment includes the operability to realize the function of an upper layer application (the integrated data access application server 300) by the registration process executed by the test search system 400 and the metadata database 500 with respect to all the files stored at the file storage 600 in which the medical images and the electronic medical records, both including different types of data from one another, are aggregated in a file format at the file storage 600. It is to be noted that the details concerning the file format in which the medical images and the electronic medical records are stored at the file storage 600, and the details concerning the internal configuration of the file storage 600, the test search system 400, the metadata database 500, the integrated data access application server 300, and the integrated data access application client 200 are outside of the scope of the essential aspect of the present embodiment.

Next, the details of each information process apparatuses, which is a component of the medical information system, will be described.

The medical image distribution system 900 is a system configured to manage medical images and distribute the medical images to an external system and/or a client computer operated by a user. The electronic medical record system 1100 is a system configured to manage the electronic medical records of patients and provide electronic medical records to an external system and/or a client computer operated by a user. The medical record adapter 800 is connected to the medical image distribution system 900 and acquires desired medical images, or the like, in a file format from the medical image distribution system 900 in accordance with a communication protocol of the medical image distribution function provided by the medical image distribution system 900. Note that the communication protocol of the medical image distribution function includes, in general, DICOM, or the like, which is the standard for handling medical images.

The electronic medical record adapter 1000 is connected to the electronic medical record system 1100 and acquires desired electronic medical record information in a file format from the electronic medical record system 1100 in accordance with a communication protocol of the electronic medical record information distribution function provided by the electronic medical record system 1100. Note that the communication protocol of the electronic medical record information distribution function include, in general, HL7, or the like, which is the standard concerning the connection between medical systems.

The metadata extraction—file registration system 700 is connected to the medical record adapter 800 and the electronic medical record adapter 1000. The metadata extraction—file registration system 700 acquires data provided by the data source system (the medical image distribution system 900 and the electronic medical record system 1100) connected to the medical record adapter 800 and the electronic medical record adapter 1000 after said data has been converted into a file format by the medical record adapter 800 and the electronic medical record adapter 1000. Then, the metadata extraction—file registration system 700 extracts metadata (e.g., patient ID, date, time and test ID, etc.) from the information in the acquired file. Further, the metadata extraction—file registration system 700 registers the acquired files and the extracted metadata at the file storage 600.

The test search system 400 is connected to the file storage 600 and executes a process which enables the files stored at the file storage 600 to be searched via text search. To be more specific, the test search system 400 collects the files (medical image file, electronic medical record file, and metadata file extracted from medical image file and electronic medical record file) stored at the file storage 600. Then, the test search system 400 generates for each file an index which will be used during the execution of a text search process with respect to the collected files.

The metadata database 500 manages the metadata extracted by the metadata extraction—file registration system 700 so as to enable the search process, which uses the metadata, and the aggregation process which uses the metadata. To be more specific, the metadata database 500 collects the metadata files stored at the file storage 600, stores at database the metadata stored at the collected metadata files, and manages the same. The test search system 400, the metadata database 500, the file storage 600, the metadata extraction—file registration system 700, the medical record adapter 800, and the electronic medical record adapter 1000 each function as a component (process unit) configured to execute a prescribed process with respect to the files.

The integrated data access application server 300 is connected to the metadata database 500, the test search system 400 and the file storage 600. The integrated data access application server 300 transmits a search request satisfying a search term inputted by a user via, the integrated, data access application client 200 to the metadata database 500 and the test search system 400. Then, after receiving a search result from the metadata database 500 and the test search system 400, the integrated data access application server 300 returns search result information which included the information combining the received research results to the integrated data access application client 200.

The integrated data access application client 200 is a program used by a user when the user uses the integrated data access application. The integrated data access application client 200 accepts a search term input, transmits the inputted search term to the integrated data access application server 300, and displays the result information returned from the integrated data access application server 300.

Next, the progress management system 100 will be described. The progress management system 100 is connected via a network to the test search system 400, the metadata database 500, the file storage 600, the metadata extraction—file registration system 700, the medical record adapter 800, and the electronic medical record adapter 1000. The progress management system 100 collects and manages the progress status of the process executed with respect to a file by each process unit configuring a system which the progress management system 100 manages. The progress management system 100 includes a process status collection unit 101, a progress display unit 102, a process flow information 103, file ID linking information 104, and progress accumulation information 105.

The progress status collection unit 101 accesses each process unit so as to collect the progress status of each process unit. The progress display unit 102 displays the progress status collected by the 101. The process flow information 103 registers therein a process order in which each process unit executes its process. The process flow information 103 will be described in detail below with reference to FIG. 3. The file ID linking information 104 registers therein a correlation between the identification information (first identification information) of a file according to each process unit collected by the progress status collection unit 101 and the unique identification information (second identification information) of a file according particularly to the system whose progress status is managed by the progress management system 100. The file ID linking information 104 will be described in detail below with reference to FIG. 6. The progress accumulation information 105 registers therein the progress status of each process unit collected by the progress status collection unit 101. The progress accumulation information 105 will be described in detail below with reference to FIG. 7.

Next, some of the prerequisites concerning each process unit in order for the progress status collection unit 101 to collect the progress status from each process unit will be described.

Each process unit includes a file ID mapping APT (Application Program Interface) and a progress information API.

Each process unit acquires a file from an acquisition source, and executes a process to the acquired file accordingly. For example, the medical record adapter 800 acquires a file from the medical image distribution system 900, while the metadata extraction—file registration system 700 acquires a file from the medical record adapter 800 and the electronic medical record adapter 1000.

The file ID mapping API is an interface configured to provide externally a correlation between the identification information (hereinafter referred to as "file ID") of a file according particularly to the source thereof and a file ID of the said file according particularly to the process units 400 through 700 at which said file ID mapping API is arranged. For example, the file ID mapping API arranged at the metadata extraction—file registration system 700 provides externally the file ID of a file according the medical image adapter 800 and the electronic medical record adapter 1000 (acquisition source of the file) and the file ID of the file according particularly to the metadata extraction—file registration system 700.

The progress status API in an interface configured to provide externally a progress status of a file at the process units 400 through 700 at which said progress status API is arranged.

The file acquisition process by each process unit is periodically executed in a batch process manner. In each batch process the file acquisition process will be executed in a sequential manner with respect to a particular collection of files from which files are acquired. For example, the test search system 400 acquires files from the file storage 600. Normally, the acquisition target for each batch process executed by the test search system 400 includes the collection of files, out of the collections of files at the file storage 600, that were not acquired by previous file acquisition process. The progress information API provides information concerning the process status of the files that were acquired by the file acquisition process for each file.

Figure 2:
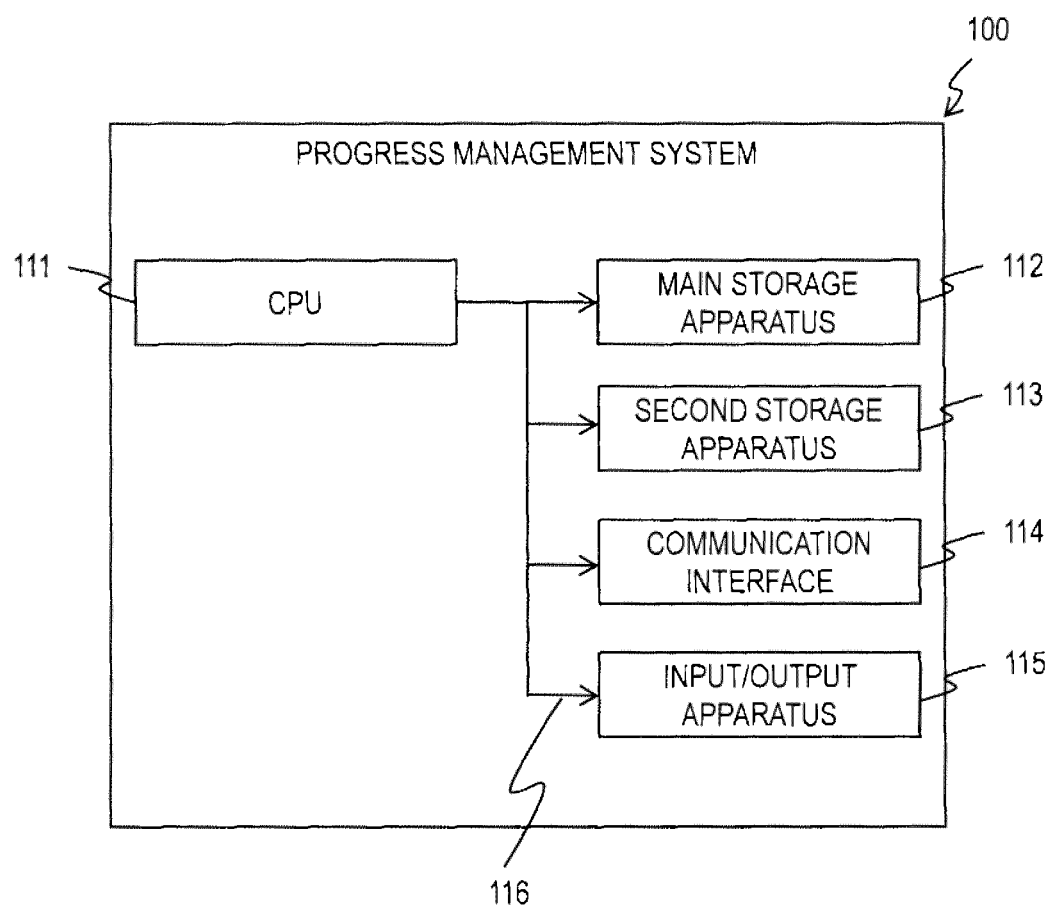
FIG. 2 is a hardware block diagram of a progress management system according to the first embodiment of the present invention.

FIG. 2 is a hardware block diagram of the progress management system 100 according to the first embodiment of the present invention. The progress management system 100 includes a CPU 111, a main storage apparatus (memory) 112, a second storage apparatus 113, a communication apparatus 114, and an input/output apparatus 115. The CPU 111, the main storage apparatus 112, the second storage apparatus 113, the communication apparatus 114, and the input/output apparatus 115 are connected to one another via a bus 116.

The CPU 111 executes the programs loaded by the main storage apparatus 112. The programs stored at the second storage apparatus 113 are loaded to the main storage apparatus 112. Various types of programs are stored at the second storage apparatus 113. The communication apparatus 114 is an interface configured to communicate with other apparatuses. The input/out apparatus 115 is an input apparatus such as a keyboard and/or a mouse, and an output apparatus such as a display unit.

Note that the second storage apparatus 113 and the main storage apparatus 112 include, besides the programs stored therein, data which is necessary for executing the programs, and execute reading process and writing process of the data to accompany the execution of the programs. Furthermore, it is to be noted that the process executed by the hardware apparatus may be executed as software utilizing virtualization technology of information processing apparatuses which are commonly used these days. The description of specific configuration method of such information processing apparatus which is not the essential aspect of the present invention will be omitted.

Further, while the hardware configuration is described using that of the progress management system 100 as an example, the description of the hardware configuration of other apparatuses in the present embodiment (the integrated data access application client 200, the integrated data access application server 300, the test search system 400, the metadata database 500, the file storage 600, the metadata extraction—file registration system 700, the medical record adapter 800, the medical image distribution system 900, the progress management system 100, and the electronic medical record system 1100) which include the same configuration as that of the progress management system 100 will be omitted.

Figure 3:
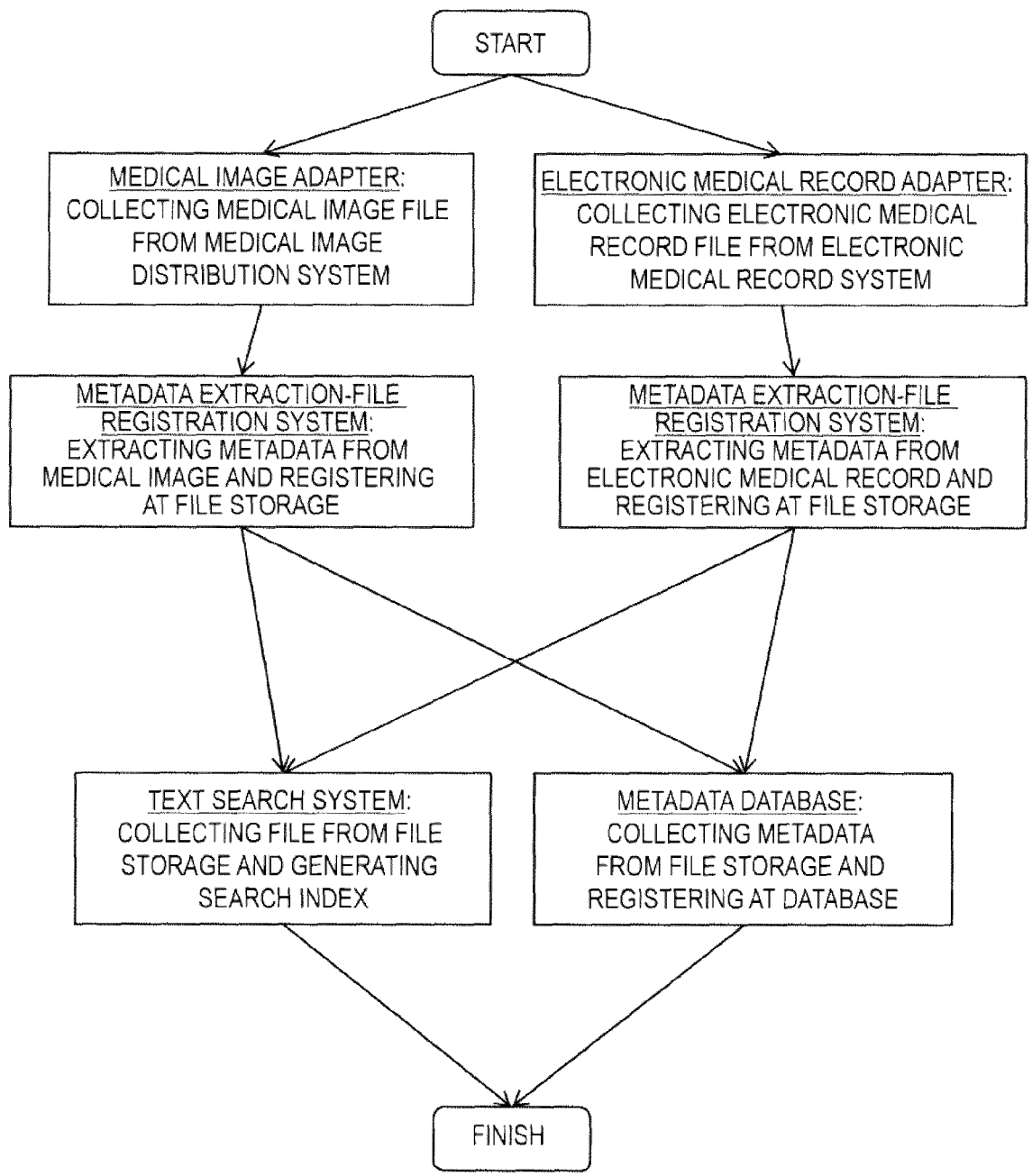
FIG. 3 is an explanatory diagram of a process order, as executed by each process unit, registered at process flow information according to the first embodiment of the present invention.

FIG. 3 is an explanatory diagram of a process order, as executed by each process unit, registered at the process flow information 103 according to the first embodiment of the present invention.

The process flow information 103 is configured in advance by an administrator, or the like, prior to the progress management system 100 managing the status of the process executed by each process unit. The process flow of the medical information system illustrated in FIG. 1 is registered at the process flow information 103 illustrated in FIG. 3.

First, the medical record adapter 800 collects medical image files from the medical image distribution system 900. Further, the electronic medical record adapter 1000 collects electronic medical record files from the electronic medical record system 1100.

Next, the metadata extraction—file registration system 700 extracts metadata from the files collected by the medical record adapter 800 and the electronic medical record adapter 1000, and registers the files collected by the medical record adapter 800 and the electronic medical record adapter 1000 and the extracted metadata at the file storage 600.

The test search system 400 collects the files registered at the file storage 600 in order to generate a search index. Further, the metadata database 500 collects the metadata registered at the file storage 600 and registers the collected metadata at a database. When the process by the test search system 400 and the process by the metadata database 500 have been completed with respect to a particular file, a series of the processes to be executed to said file is complete.

Figures 4, 5, 6:
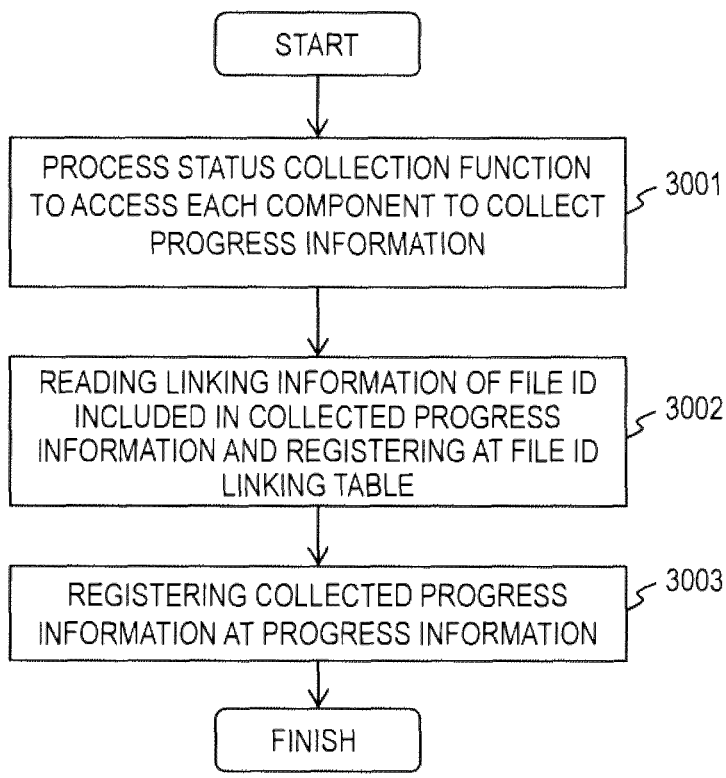
FIG. 4 is a flowchart of a process status collection process executed by a progress status collection unit according to the first embodiment of the present invention.
FIG. 5 is an explanatory diagram of progress information collected by the progress status collection unit according to the first embodiment of the present invention.
FIG. 6 is an explanatory diagram of file ID linking information according to the first embodiment of the present invention.

FIG. 4 is a flowchart of a process status collection process executed by the progress status collection unit 101 according to the first embodiment of the present invention.

The process status collection process is executed by the CPU 111 of the progress management system 100.

First, the progress status collection unit 101 collects the progress information from the progress information API arranged at each process unit (e.g., the medical record adapter 800, the electronic medical record adapter 1000, the metadata extraction—file registration system 700, the test search system 400 and the metadata database 500) which executes the process registered at the process flow information 103 (3001). The progress information collected from the progress information API retained at each process unit includes a file ID according particularly to each process unit and the progress status of a process being executed with respect to the file that is identified by the file ID. The progress status is configured with one of the values including "uncollected" indicating a status that a file has not been collected by each process unit, "unregistered" indicating a status that a process with respect to a collected file is incomplete, and "registration complete" indicating a status that the process with respect to a collected file has been complete. The details concerning the progress information collected in the process of Step 3001 will be described below with reference to FIG. 5.

Next, the progress status collection unit 101 acquires the file ID (acquisition source file ID) according particularly to the acquisition source of the file identified by the file ID according particularly to each process unit included, in the progress information collected in the process of Step 3001 from the file ID mapping API arranged at each process unit, links the file ID included in the progress information and the acquisition source file ID with the same global file ID, and registers the same at the file ID linking information 104

(3002). The details concerning the process of Step 3002 will be described using a specific example with reference to FIG. 6.

Next, the progress status collection unit 101 generates a progress information record based on the progress information collected in the process of Step 3001 and the global file ID linked in the process of Step 3002 with the file ID included in the progress information and the acquisition source file ID, registers the generated progress information record at the progress accumulation information 105 (3003), and ends the process status collection process. Note that the progress information record is generated for each piece of progress information collected from one process unit. The details concerning the process of Step 3003 will be described using a specific example with reference to FIG. 7.

The progress accumulation information 105 is updated in accordance with the progress of each process unit since the processes of Steps 3001 through. Step 3003 are repeatedly executed in a periodical manner.

By the above, the progress management system 100 updates the file ID linking information 104 and the progress accumulation information 105.

FIG. 5 is an explanatory diagram of the progress information collected by the progress status collection unit 101 according to the first embodiment of the present invention.

The progress information includes a file ID 4001, a status 4002 indicating the progress status, and a time and date 4003.

The file ID 4001 includes the file ID according particularly to the process unit. The status 4002 includes a value which indicates the progress status of a file identified by the file ID included in the file ID 4001. As stated above, the value indicating the progress status includes either one of "uncollected," "unregistered," and "registration complete." The time and date 403 includes a time and date at which the progress information API arranged at a process unit obtained a progress status.

According to FIG. 5 an event in which the progress information. API arranged at the test search system 400 transmitted the progress information at the test search system 400, which includes a file ID "0001," "uncollected" for status, and "Feb. 1, 2012 at 12:00:30" for time and date, to the progress status collection unit 101, is illustrated.

FIG. 6 is an explanatory diagram of the file ID linking information 104 according to the first embodiment of the present invention.

The file ID linking information 104 includes a global file ID 5001, a component ID 5002, and a file ID 5003, The global file ID 5001 is registered with the identification information (global file ID) of a file that is unique in a medical information system. The component ID 5002 is registered with the identification information (component ID) of the process unit which executed a process with respect to the file identified by the global file ID registered at the global file ID 5001. The file ID 5003 is registered with the identification information, which is particular to the process unit identified by the component ID registered at the component ID 5002, of the file identified by the global file ID registered at the global file ID 5001.

For example, in the process of Step 3002 illustrated in FIG. 4, the progress status collection unit 101 acquires from the file ID mapping API arranged at the test search system 400 the file ID "0001" which is particular to the test search system 400, and the file ID (acquisition source file ID) "dcm/20120202a.dcm." which is particular to the file storage 600 which is the acquisition source of the file identified by the file ID "0001."

Then, when the global file ID linked to the acquisition source file ID "dcm/20120202a.dcm" exists in the file ID linking information 104, the process status collection unit 101 adds a new record to the file ID linking information 104, registers the global file ID at the global file ID 5001 of the added record, registers the identification information of the text search system 400 at the component file ID 5002, and registers "0001" at the file ID 5003.

On the other hand, when the global file ID linked to the acquisition source file ID "dcm/20120202a.dcm" does not exist in the file ID linking information 104, the process status collection unit 101 generates a new global file ID, and adds two records to the file ID linking information 104. Then, the process status collection unit 101 registers the new global file ID at the global file ID 5001 of the two added records. Further, the process status collection unit 101 registers the identification information of the text search system 400 at the component ID 5002 and "0001" at the file ID 5003 of one of the added two records. Further, the process status collection unit 101 registers the identification information of the file storage 600 of the acquisition source at the component ID 5002 and the acquisition source file ID "dcm120120202a.dcm" at the file ID 5003 of the other of the added two records.

In other words, in the process of Step 3002 the progress status collection unit 101 links the file ID according particularly to the process unit included in the progress information collected in the process of Step 3001 and the acquisition source file ID with the global file ID, and registers the linked information at the file ID linking information 104.

FIG. 7 is an explanatory diagram of the progress accumulation information 105 according to the first embodiment of the present invention.

The progress accumulation information 105 includes a global file ID 6001, a component ID 6002, a status 6003, and a time and date 6004.

The global file ID 6001 registers therein the global file ID. The component ID 6002 registers therein the component ID. The status 6003 registers therein a value indicating the progress status of the file identified by the global file ID registered at the global file ID 6001, The time and date 6004 registers therein a time and date in which the progress information API arranged at the process unit acquired a progress status.

For example, a process taken in Step 3003 when the progress status collection unit 101 collects in the process of Step 3001 illustrated in FIG. 4 the process information illustrated in FIG. 5 from the progress information API arranged at the test search system 400, and acquires in the process of Step 3002 the file ID "0001" and the acquisition source file ID "dcm/20120202a.dcm" from the file ID mapping API arranged at the test search system 400 will be described.

The progress status collection unit 101 adds a new record to the progress accumulation information 105 and registers at the global file ID 6001 of the added record a global file ID "000003" which was linked to the file ID "0001" of the test search system 400 in the process of Step 3002. Then, the progress status collection unit 101 registers the identification information of the test search system 400 at the component ID 6002 of the added record, "uncollected" at the status 6003, and "Feb. 1, 2012 12:00:30" at the time and date 6004.

Figure 8:
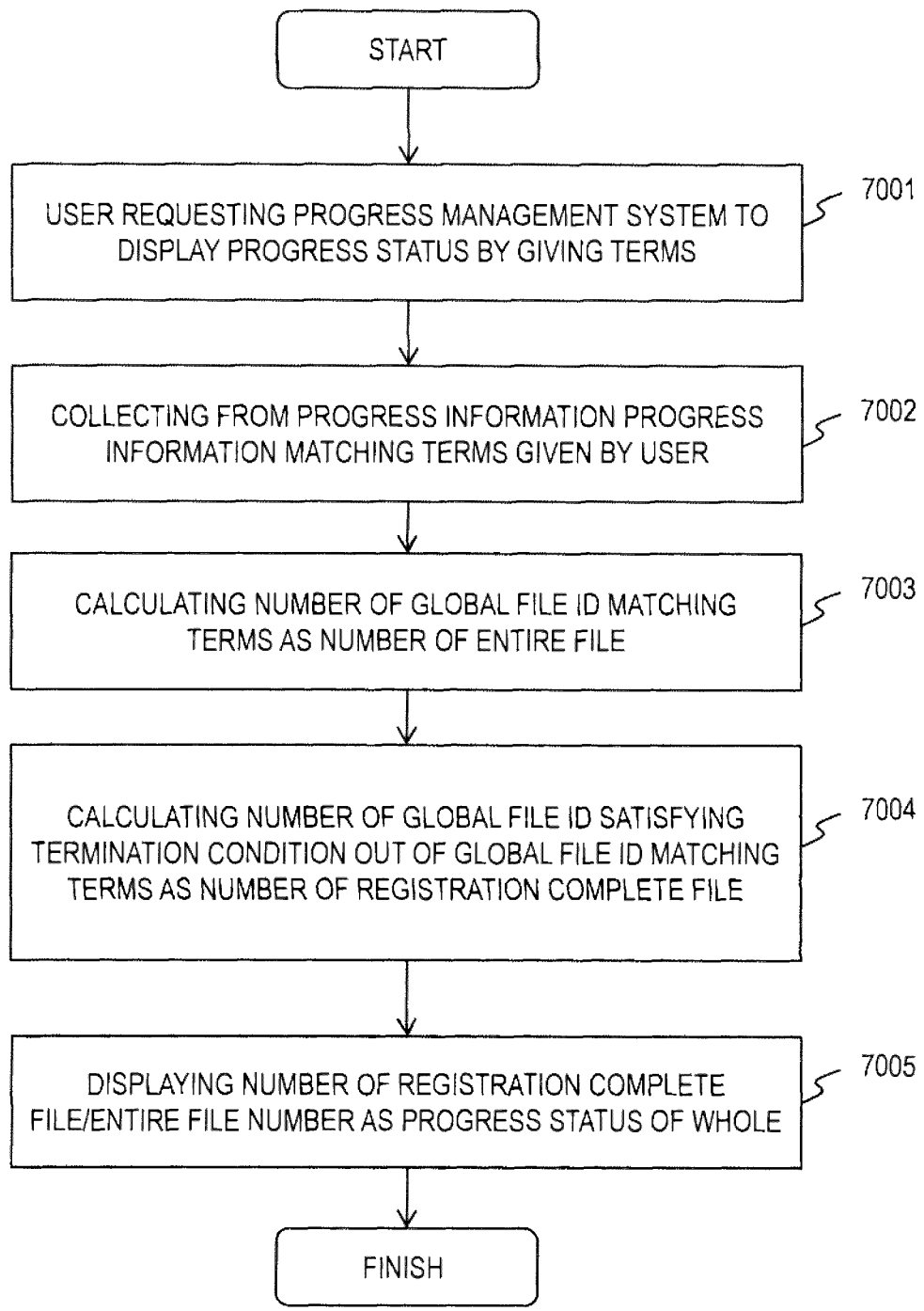
FIG. 8 is a flowchart of a progress display process executed by a progress display unit according to the first embodiment of the present invention.

FIG. 8 is a flowchart of a progress display process executed by the progress display unit 102 according to the first embodiment of the present invention. The progress display process is executed by the CPU 111 of the progress management system 100.

First, the progress management system 100 receives a progress status display request inputted by a user (7001). The user may input the progress status display request at the integrated data access application client 200, a computer which is not illustrated, or at the progress management system 100 in a direct manner. The progress status display request includes a file search condition. The file search condition includes a condition of a file whose progress status is the subject of the user's inquiry. The file search condition may include, for example, that which is designated (i.e., file created after Feb. 1, 2012) by the time and date 6004 registered at the progress accumulation information 105. Note that when the progress accumulation information 105 includes information other than the time and date 6004 (e.g., file type, etc.), such information may be used for designating a file to be searched.

When the progress status display request is received during the process of Step 7001, the progress management system 100 moves the process to the progress display unit 102. The progress display unit 102 collects a record that matches the file search condition included in the progress status display request from the records registered at the progress accumulation information 105 (7002).

Next, the progress display unit 102 refers to the global file ID 6001 of the record from the progress accumulation information 105 collected in the process of Step 7002 in order to calculate the number of the global file IDs as the number of the entire files (7003). In other words, in the process of Step 7003, the progress display unit 102 calculates the number of files matching the file search condition.

Next, the progress display unit 102 refers to the component ID 6002 and the status 6003 of the record from the progress accumulation information 105 collected in the process of Step 7002 in order to calculate the number of the global file IDs satisfying a termination condition as the number of the files whose registration has been completed (7004). The termination condition includes a condition with which a series of processes, which is executed with respect to a file by a system managed by the progress management system 100, is terminated. In other words, in the process of Step 7004, the progress display unit 102 calculates the number of the files for which a series of processes, executed by a system managed by the progress management system 100, have finished.

For example, according to the process flow information 103 illustrated in FIG. 3, the termination condition includes that the process by the test search system 400 and the process by the metadata database 500 have been finished. That is, the progress display unit 102 calculates the number of the global file IDs, which include the record in which the identification information of the test search system 400 is registered at the component ID 6002 and "registration complete" is registered at the status 6003 and the record in which the identification information of the metadata database 500 is registered at the component ID 6002 and "registration complete" is registered at the status 6003, as the number of the files whose registration has been complete.

Next, the progress display unit 102 calculates a file registration completion ratio by dividing the number of the files whose registration has been completed calculated in the process of Step 7004 by the number of entire files calculated in the process of Step 7003, returns the calculated file registration completion ratio as a progress display response to the computer which had transmitted the progress status display request (7005), and ends the process. Note the file registration completion ratio indicates the progress of the entire system managed by the progress management system 100. Further, the computer which received the progress display response displays the file registration completion ratio concerning the progress display response.

For example, the progress display process illustrated in FIG. 8 will be described by using the progress accumulation information 105 illustrated in FIG. 7 when a file search condition includes a file generated after Feb. 1, 2012.

In this case, all the records registered at the progress accumulation information 105 illustrated in FIG. 7 will be collected in the process of Step 7002.

Next, in the process of Step 7003, since "000001," "000002," and "000003" are registered at the global file ID 6001 of the record collected in the process of Step 7002, the number of the entire files will be calculated as 3.

Next, in the process of Step 7004, since the global file ID, which includes the record in which the identification information of the test search system 400 is registered at the component ID 6002 and "registration complete" is registered at the status 6003 and the record in which the identification information of the metadata database 500 is registered at the component ID 6002 and "registration complete" is registered at the status 6003, is "000001," the number of the files whose registration has been completed will be calculated as 1.

Note that the global file ID "000002" does not satisfy the termination condition because among the records of the global file ID "000002," "uncollected" is registered at the status 6003 of the record in which the identification information of the metadata database 500 is registered at the component ID 6002.

Further, the records of the global file ID "000003" do not include the record in which the identification information of the metadata database 500 is registered at the component ID 6002, the global file ID "000003" does not satisfy the termination condition. This is because since the metadata database 500 has not obtained the file of the global file ID "000003" from the file storage 600, the metadata database 500 does not include the progress status of the file of the global file ID "000003."

Next, in the process of Step 7005, the file registration completion ratio will be calculated as 33.3% since 1, which is the number of the file whose registration has been complete, is divided by 3, which is the number of the entire files.

By the above, even when a single file is designated with a file ID that is unique to each process unit, the progress management system 100 is operable to manage the progress status of each file by designating the global file ID to the same file.

Next, an entire process end time calculation process will be described with reference to FIG. 9. The entire process end time calculation process is a process in which the process unit having an unprocessed file calculates an estimated end time at which the execution of the process will be finished, wherein, based on the calculated estimated end time of each process unit, an estimated end time for the entire system managed by the progress management system 100 finishes executing a series of processes with respect to the entire files is calculated.

Figure 9:
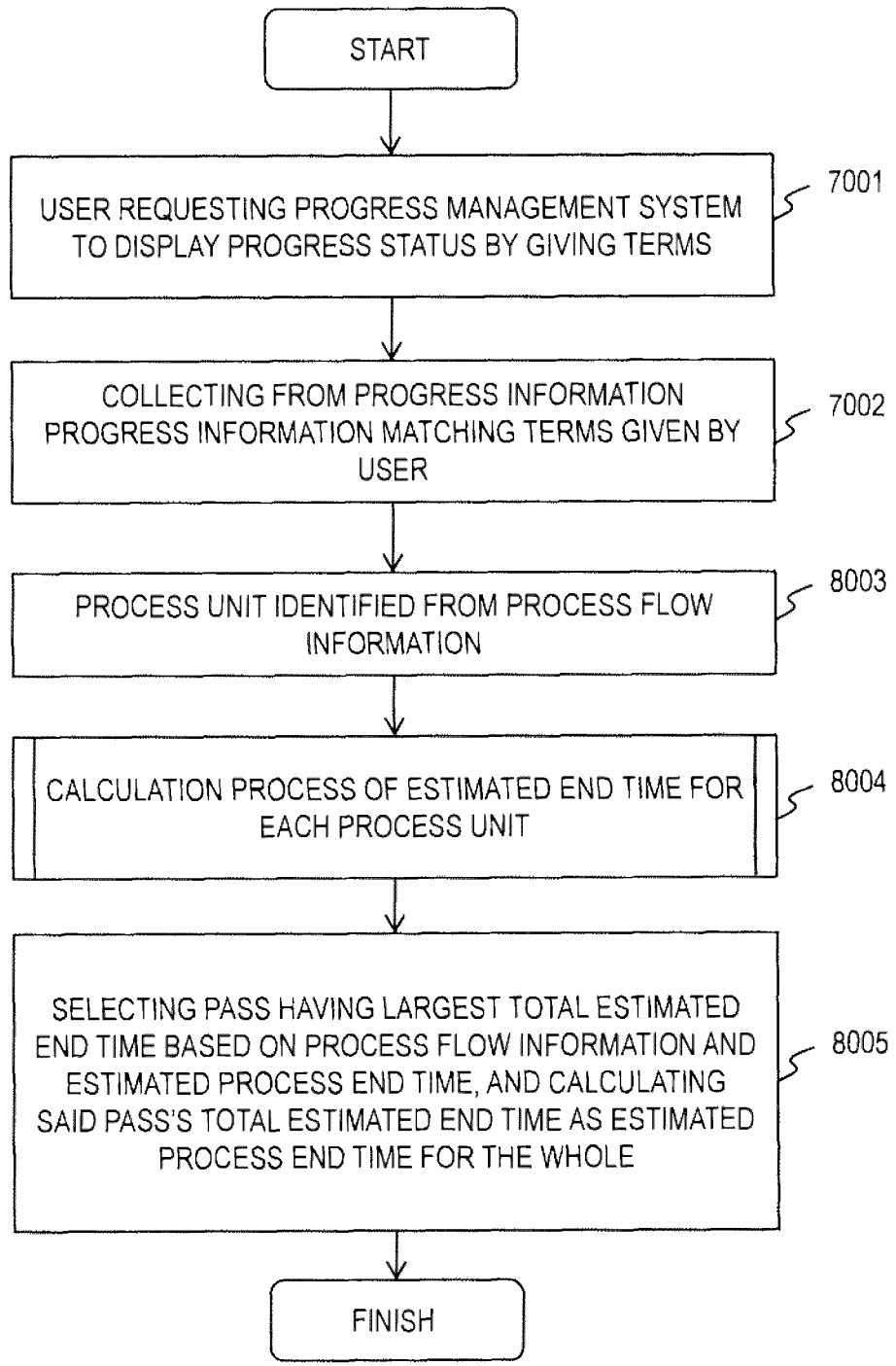
FIG. 9 is a flowchart of an entire process end time calculation process according to the first embodiment of the present invention.

FIG. 9 is a flowchart of the entire process end time calculation process according to the first embodiment of the present invention. The entire process end time calculation process is executed by the CPU 111 of the progress management system 100. Note that since the processes for Step 7001 and. Step 7002 illustrated in FIG. 9 are the same processes as Step 7001 and Step 7002 illustrated in FIG. 8, the same reference numerals are designated and the description thereof will be omitted.

After the process of Step 7002 is executed, the progress display unit 102 refers to the process flow information 103 in order to identify all the process units which will execute process to files (8003). According to the process flow information 103 illustrated in FIG. 3, the medical record adapter 800, the electronic medical record adapter 1000, the metadata extraction—file registration system 700, the test search system 400, and the metadata database 500 are identified as the process units to execute processes. Note that the process of Step 8003 does not need to be executed when the process unit to be identified in the process of Step 8003 is already registered with the progress management system 100.

Next, the progress display unit 102 refers to the record of the progress accumulation information 105 collected in the process of Step 7002 in order to identify the number of the files yet to be processed for each process unit identified in the process of Step 8003, and executes an estimated end time calculation process for calculating an estimated end time for each process unit identified in the process of Step 8003 based the identified number of the files yet to be processed (8004). The process of Step 8004 will be described in detail with reference to FIG. 10, Next, the progress display unit 102 arranges the estimated end time calculated in the process of Step 8004 at each process unit over the process flow information 103, selects a pass having the largest total estimated end time, calculates the total estimated end time of the selected pass as the estimated end time of the system managed by the progress management system 100, returns the calculated estimated end time as the progress display response to the computer which had transmitted the progress status display request (8005), and ends the process. The process of Step 8005 will be described in detail with reference to FIG. 11.

Figure 10:
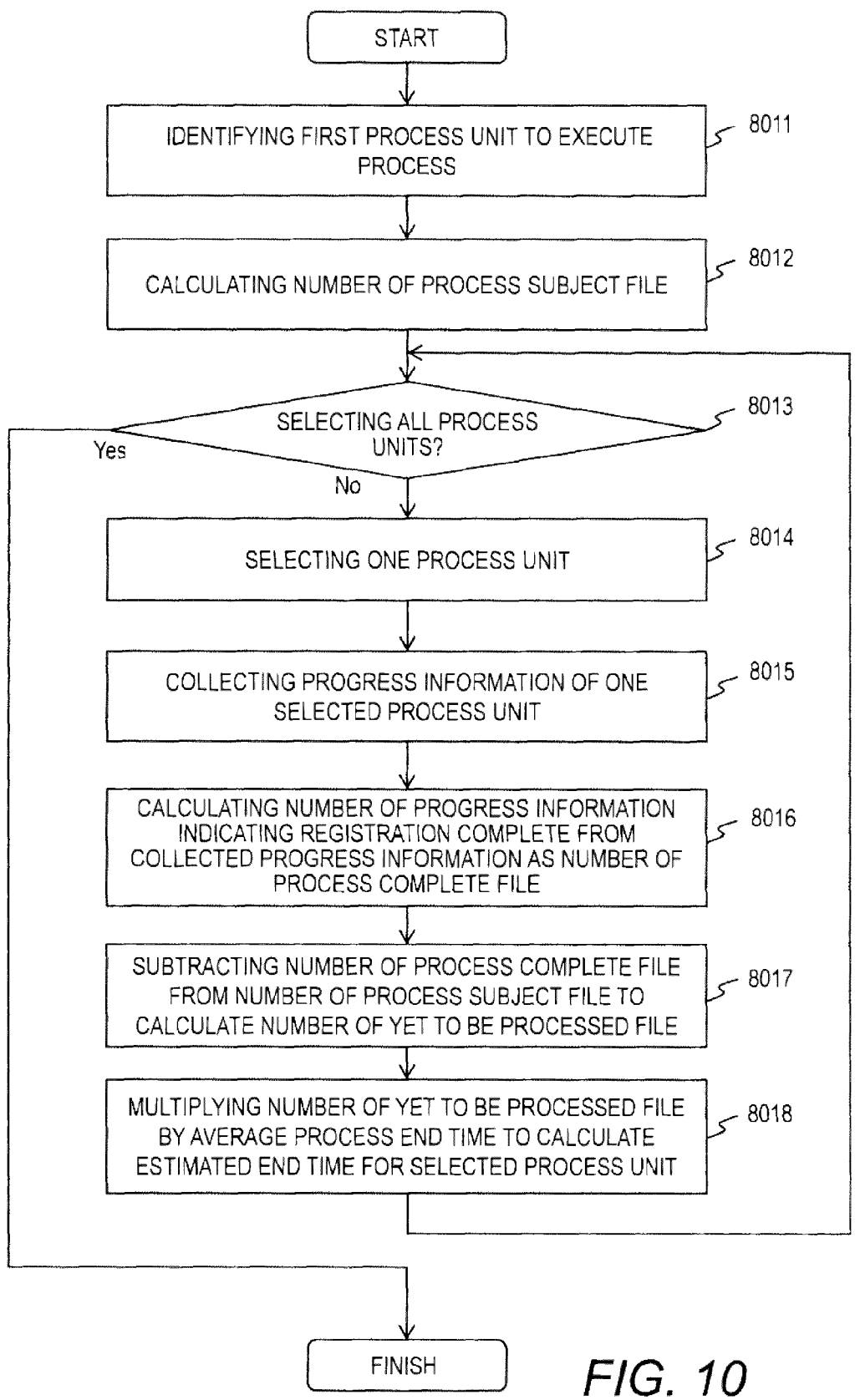
FIG. 10 is a flowchart of an estimated end time calculation process according to the first embodiment of the present invention.

Next, the estimated end time calculation process will be described with reference to FIG. 10. FIG. 10 is a flowchart of the estimated end time calculation process according to the first embodiment of the present invention.

First, the progress display unit 102 refers to the process flow information 103 in order to identify the process unit which will be the first to execute a process with respect to a file (8011). Next, the progress display unit 102 identifies a record in which the identification information of the process unit which will be the first to execute a process is registered at the component ID 6002 out of the records of the progress accumulation information 105 collected in the process of Step 7002, and calculates the number of the global file ID of the identified record as the number of the files to be processed (8012).

Next, the progress display unit 102 makes a determination as to whether or not all the process units which were identified in the process of Step 8003 have been selected in the process of Step 8014 (8013).

When it is determined in the process of Step 8013 that all the process units which were identified in the process of Step 8003 have been selected in the process of Step 8014, the progress display unit 102 ends the estimated end time calculation process, and moves to the process of Step 8005.

On the other hand, when it is determined in the process of Step 8013 that all the process units which were identified in the process of Step 8003 have not been selected in the process of Step 8014, the progress display unit 102 selects one process unit that has not been selected out of the process units identified in the process of Step 8003 (8014).

Next, the progress display unit 102 collects a record in which the identification information of the process unit selected in the process of Step 8014 is registered at the component ID 6002 out of the records of the progress accumulation information 105 collected in the process of Step 7002 (8015).

Next, the progress display unit 102 calculates the number of records in which "registration complete" is registered at the status 6003 out of the records collected in the process of Step 8015 as the number of the files whose process has been completed (8016).

Next, the progress display unit 102 calculates the number of the files yet to be processed by the process unit selected in the process of Step 8014 by subtracting the number of the files whose process has been completed calculated in the process of Step 8016 from the number of the files to be processed calculated in the process of Step 8012 (8017).

Next, the progress display unit 102 calculates the estimated end time which indicates the time it takes for the process unit selected in the process of Step 8014 to execute the process with respect to the yet to be processed file by multiplying the number of the files yet to be processed calculated in the process of Step 8017 by an average process time for the process unit selected in the process of Step 8014 (8018), and moves to the process of Step 8013. Note that each process unit calculates the average process time for each process executed with respect to each file and notifies the progress management system 100 with the calculated average process time. By the above, the number of the files yet to be processed for each process unit is calculated by subtracting the number of files whose process has been completed from the number of the files to be processed by each process unit, and accordingly, it becomes possible to calculate the estimated end time for each process unit from the calculated number of the files yet to be processed and the average process time.

Next, a calculation process of an estimated process time of the entire system illustrated in the process of Step 8005 illustrated in FIG. 9 will be described with reference to FIG. 11.

Figure 11:
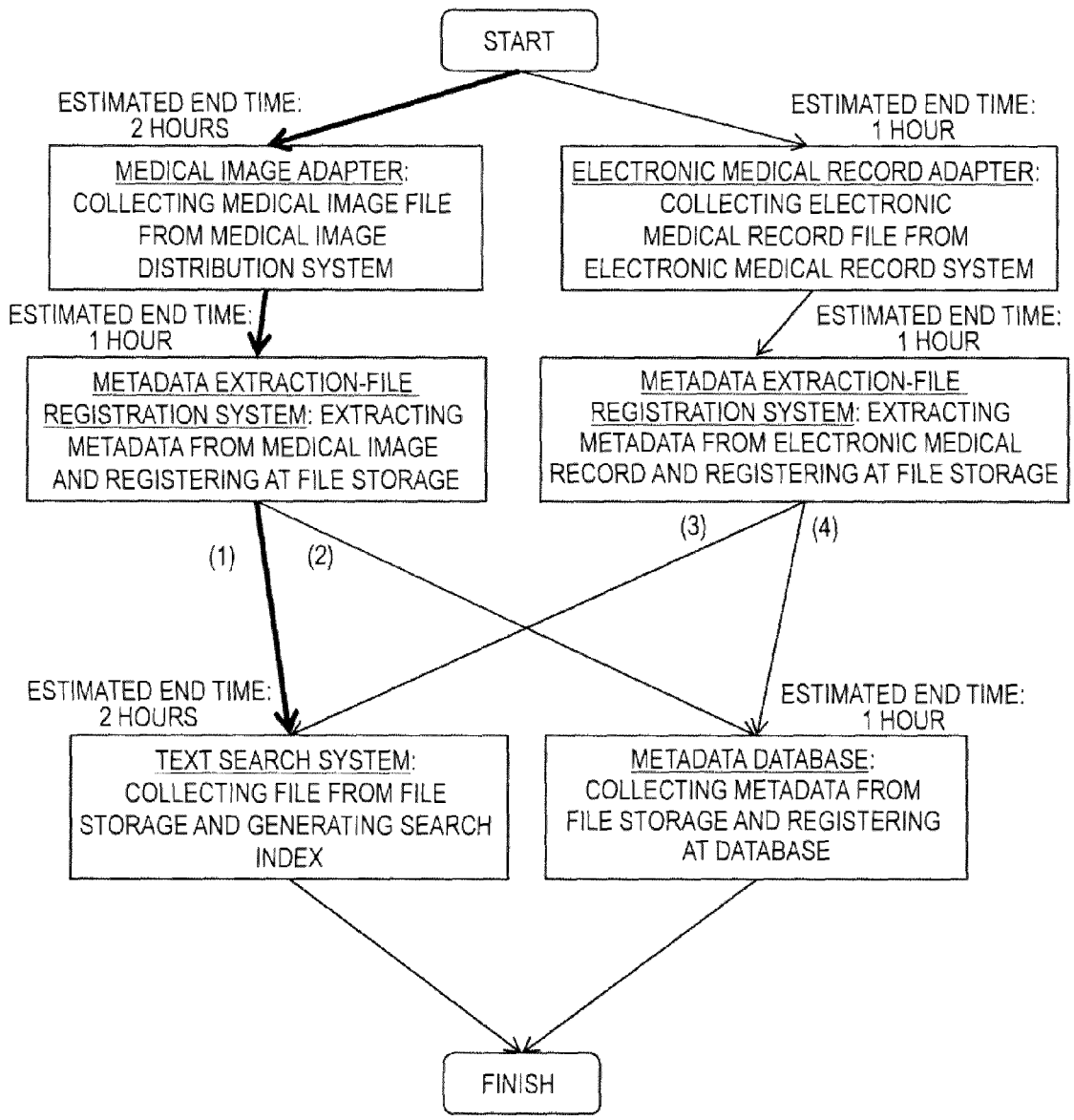
FIG. 11 is an explanatory diagram of a calculation process of an estimated process time of the entire system according to the first embodiment of the present invention.

FIG. 11 is an explanatory diagram of the calculation process of the estimated process time of the entire system according to the first embodiment of the present invention.

FIG. 11 illustrates the estimated end time of each process unit arranged at each process unit according to the process flow information illustrated in FIG. 3, and illustrates the estimated end time above each process unit.

In this context, there are four passes (1) through (4) illustrated in FIG. 11 from the metadata extraction—file registration system. The total estimated end time of the pass indicated as (1) is 5 hours (=2±1+2); the total estimated end time of the pass indicated as (2) is 4 hours (=2+1+1); the total estimated end time of the pass indicated as (3) is 4 hours (=1+1+2); and the total estimated end time of the pass indicated as (4) is 3 hours (=1+1+1).

Accordingly, the estimated end time of the system managed by the progress management system 100 is calculated as 5 hours since the pass (1) indicates the largest total estimated end time.

As the above, according to FIG. 9 through FIG. 11, it becomes possible to know how long it will take for the system managed by the progress management system 100 to finish the process executed to all files.

Next, a progress status per process unit calculation process, which calculates the progress status for each process unit, will be described with reference to FIG. 12 and FIG. 13. The progress status per process unit calculation process calculates a value, which is obtained by dividing the number of the files whose process has been completed by the number of the files to be processed, as the progress status, and calculates the estimated end time for each process unit.

Figure 12:
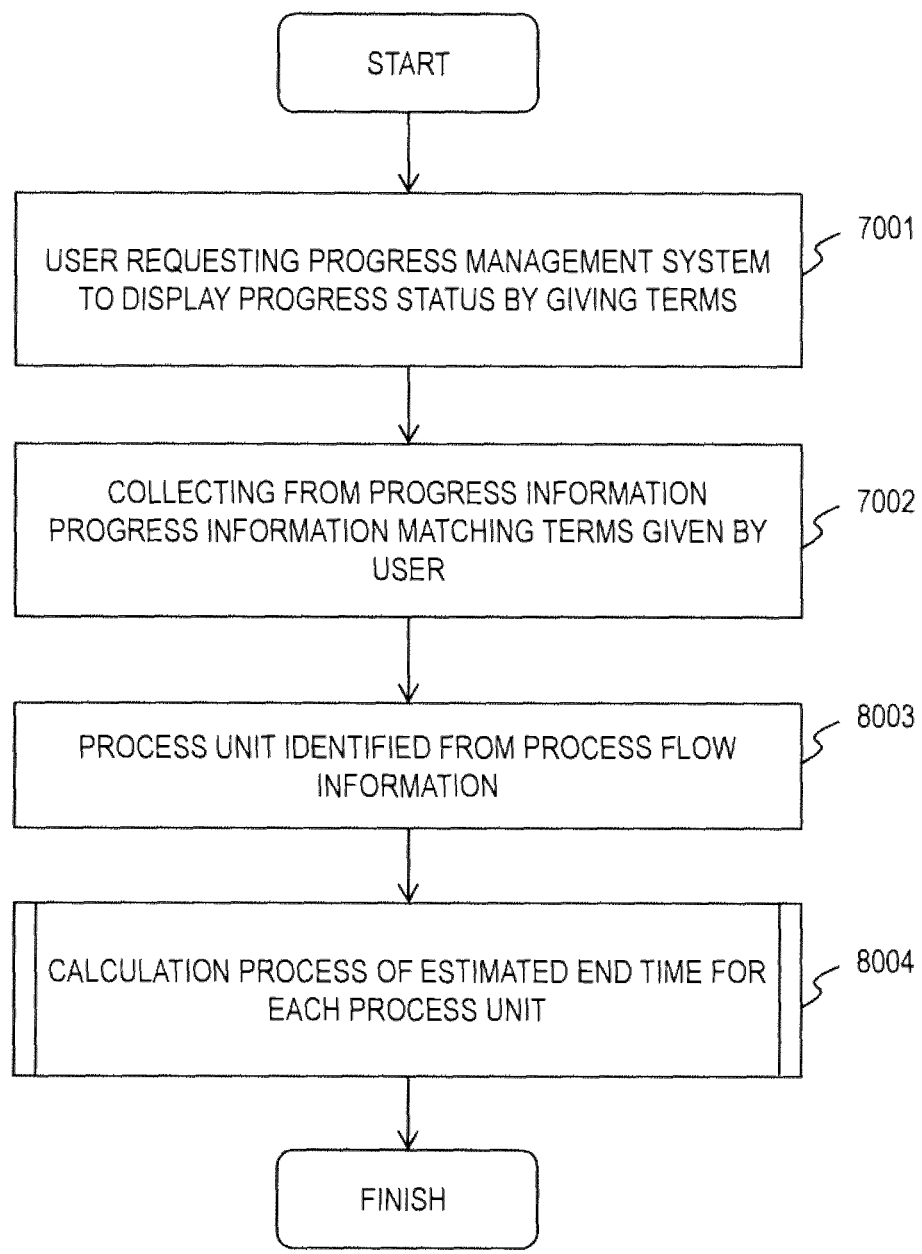
FIG. 12 is a flowchart of a progress status per process unit calculation process according to the first embodiment of the present invention.

FIG. 12 is a flowchart of the progress status per process unit calculation process according to the first embodiment of the present invention. The progress status per process unit calculation process is executed by the CPU 111 of the progress management system 100.

The progress status per process unit calculation process illustrated in FIG. 12 is different from the entire process end time calculation process illustrated in FIG. 9 in that the progress status per process unit calculation process illustrated in FIG. 12 does not execute the process of Step 8005. Note that the difference between the estimated end time calculation process (8004) illustrated in FIG. 13 and the estimated end time calculation process illustrated in FIG. 10 will be described in detail with reference to FIG. 13.

Figure 13:
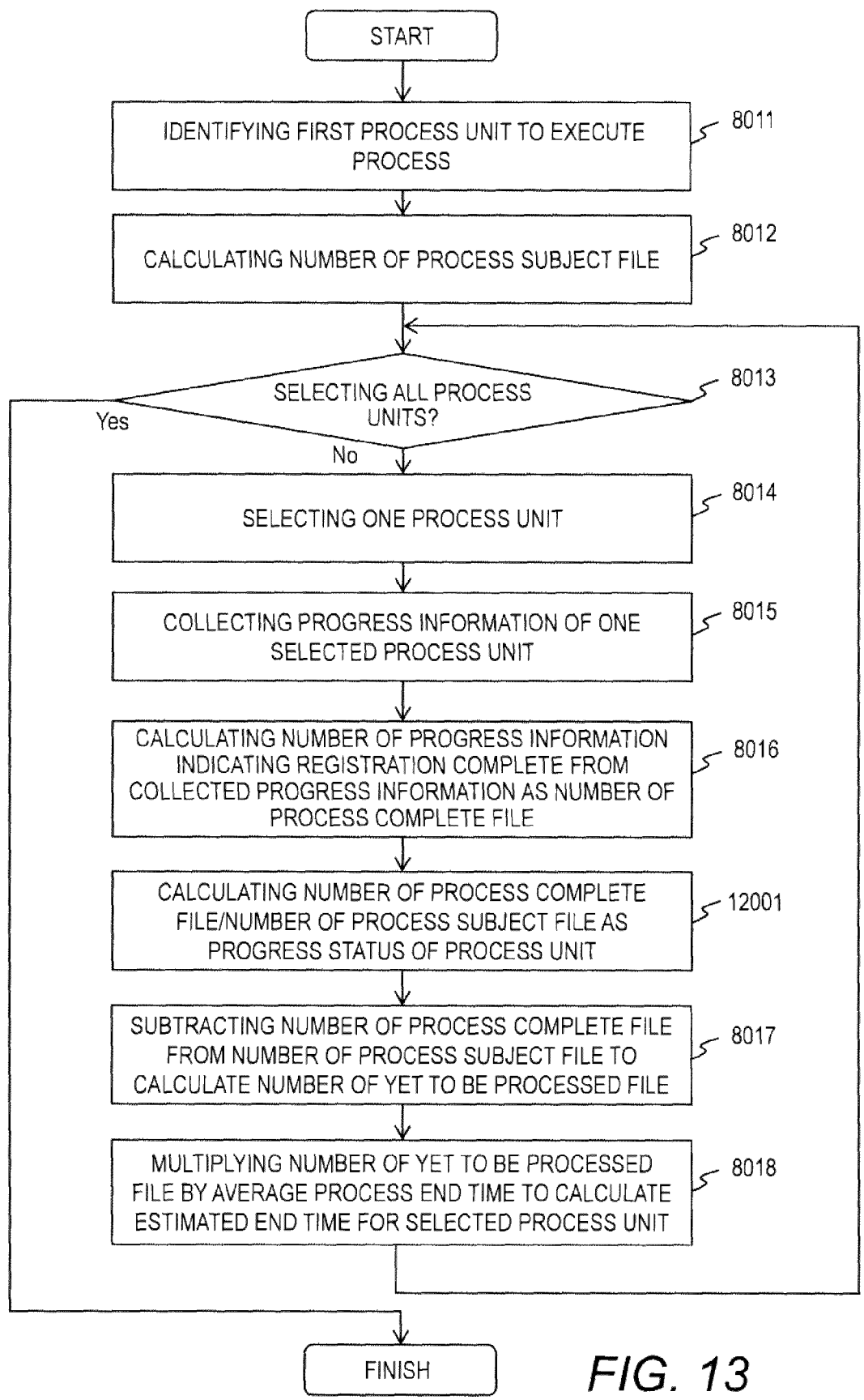
FIG. 13 is a flowchart of an estimated end time calculation process of the progress status per process unit calculation process according to the first embodiment of the present invention.

FIG. 13 is a flowchart of the estimated end time calculation process of the progress status per process unit calculation process according to the first embodiment of the present invention. Note among the processes of the estimated end time calculation process illustrated in FIG. 13 those processes corresponding to the processes illustrated in FIG. 10 will be designated by the same reference numeral as those in FIG. 10 and the description thereof will be omitted.

After the number of the file whose process has been completed was calculated in the process of Step 8016, the progress display unit 102 calculates, by dividing the number of the file whose process has been completed calculated in the process of Step 8016 by the number of the files to be processed calculated in the process of Step 8014, the file registration completion ratio of the process unit selected in the process of Step 8014 (12001), and proceeds to the process of Step 8017.

By the above, in the progress status per process unit calculation process the progress status of each process unit is calculated in the process of Step 12001 and the estimated end time for each process unit is calculated in the process of Step 8018, whereby a user will be able to know the time required for a process to be finished for each process unit.

Figure 14:
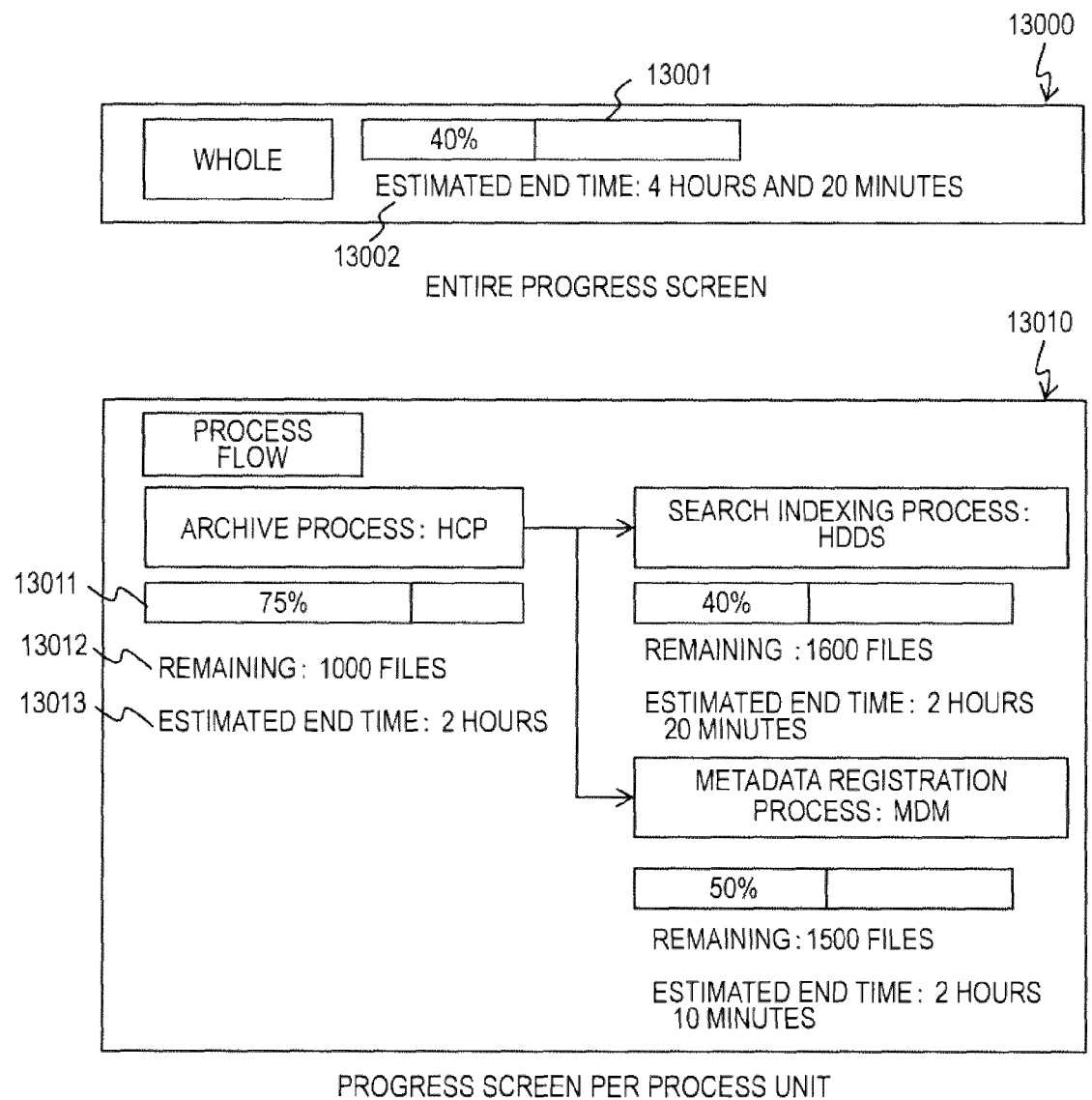
FIG. 14 is an explanatory diagram of a progress information display screen according to the first embodiment of the present invention.

FIG. 14 is an explanatory diagram of a progress information display screen according to the first embodiment of the present invention.

The progress information display screen illustrated in FIG. 14 will be displayed at a display unit of the computer which has received a progress display response in response to a progress display request. The progress information display screen includes an entire progress screen 13000 and a progress screen per process unit 13010.

The entire progress screen 13000 includes a file registration completion ratio display field 13001 and an estimated end time display field 13002.

The file registration completion ratio display field 13001 is a field configured to display the file registration completion ratio calculated in the process of Step 7005 illustrated in 7005. The estimated end time display field 13002 is a field configured to display the estimated end time calculated in the process of Step 8005 illustrated in FIG. 9.

The progress screen per process unit 13010 displays the processing order of each process unit in accordance with the process flow information 103, while the progress screen per process unit 13010 includes, in a manner corresponding to each process unit, a file registration completion ratio display field 13011, a yet to be processed file number display field 13012, and an estimated end time display field 13013.

The file registration completion ratio display field 13011 is a field configured to display the file registration completion ratio of each process unit calculated in the process of Step 12001 illustrated in FIG. 13. The yet to be processed file number display field 13012 is a field configured to display the yet to be processed file number for each process unit calculated in the process of Step 8017 illustrated in FIG. 13. The estimated end time display field is a field configured to display the estimated end time of each process unit calculated in the process of Step 8018 illustrated in FIG. 13.

By this, when using a system having multiple process units for executing processes with respect to files, a user is able to grasp the progress status of the entire system and the progress status each process unit. Accordingly, the user is able to grasp at what point in time a desired file becomes available for the entire system.

Second Embodiment

Hereinafter, a second embodiment of the present invention will be described with reference to FIG. 15 and FIG. 16.

In the second embodiment, priority will be assigned to the files to be processed wherein each process unit executes processes to the files in the order of the priority. A user is able to modify the priority of a specific files via the progress management system 100.

Figure 15:
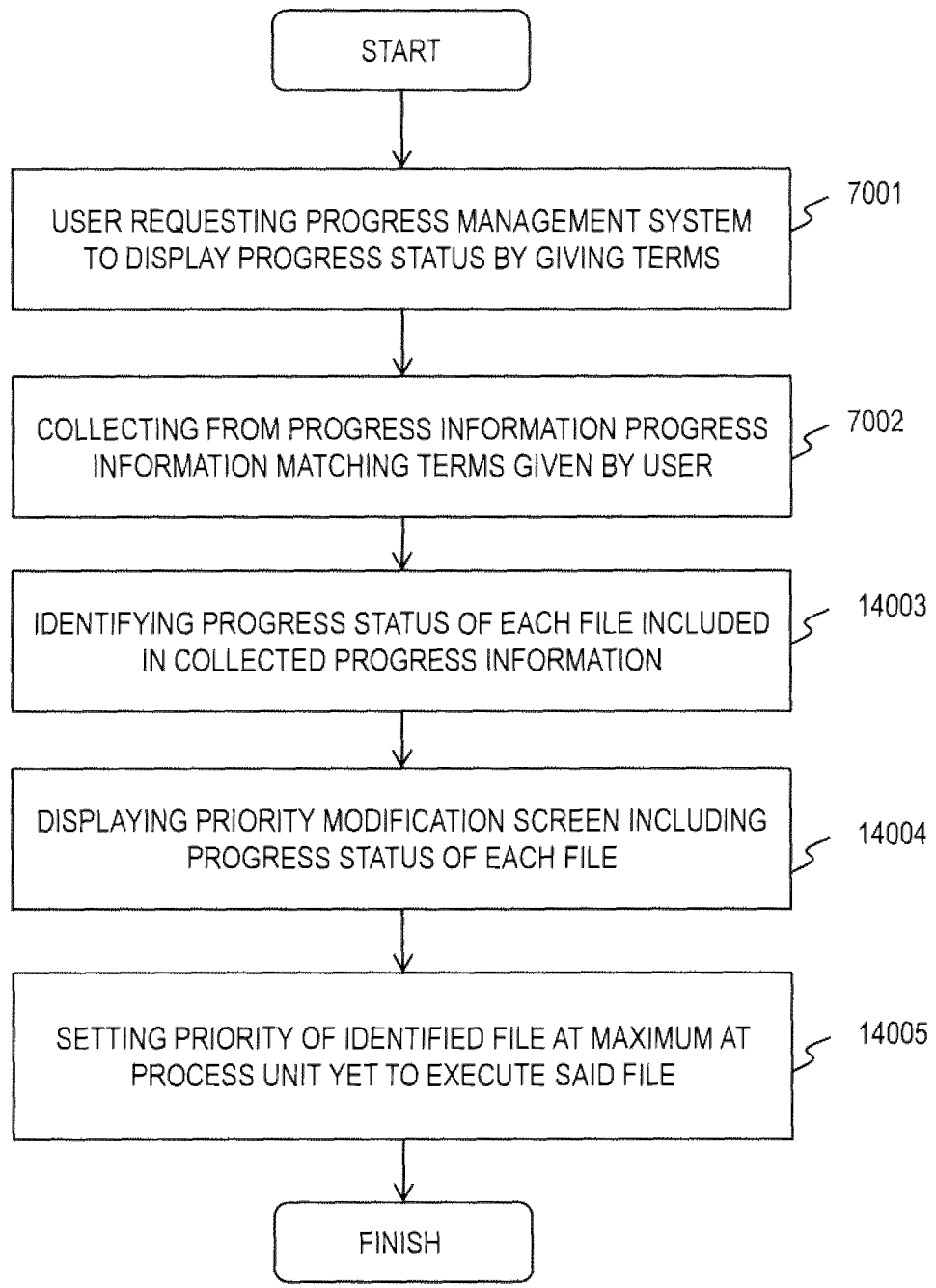
FIG. 15 is a flowchart of a priority modification process according to a second embodiment of the present invention.

FIG. 15 is a flowchart of a priority modification process according to the second embodiment of the present invention. Note among the processes illustrated in FIG. 15 those processes corresponding to the processes illustrated in FIG. 8 will be designated by the same reference numerals as those in FIG. 8 and the description thereof will be omitted.

In the process of Step 7001, the file search term inputted by a user includes a condition to search for a file whose priority will be modified.

In the process of Step 7002, after the records that match the file search term have been collected from the progress accumulation information 105, the progress display unit 102 identifies the progress status of the file matching the file search term (14003). The file matching the file search term is identified by the global file ID of the record of the progress accumulation information. 105 collected in the process of Step 7002. Further, the progress display unit 102 refers to the record of the progress accumulation information 105 collected in the process of Step 7002 in order to identify the global file ID satisfying the termination condition and the global file ID not satisfying the terminal condition. Note that the terminal condition is the same as that described in the process of Step 7004 illustrated in FIG. 8.

Next, the progress display unit 102 displays a priority modification screen 15000 which includes the file name of the file matching the file search term and the progress status of the file identified in the process of Step 14003 (14004). A user designates a file whose priority will be modified while viewing the priority modification screen 15000. The priority modification screen 15000 will be described in detail with reference to FIG. 16. Note that the designation of the file whose priority will be modified by a user will be executed by the input by the user on the progress display unit 102 via an input device which is not depicted in the drawings.

Next, after receiving the inputted designation of the file, the progress display unit 102 sets the priority of the file at the process unit that has not executed its process to the designated file is set to maximum, and ends the process (14005).

By this, the process of the file designated by the user will be executed with priority compared with the processes to be executed to other files, and accordingly, the file designated by the user will become available before other files.

FIG. 16 is an explanatory diagram of the priority modification screen according to the second embodiment of the present invention.

The priority modification screen 15000 includes a file search term input field 15001, a file registration completion ratio display field 15002, a yet to be processed file number display field 15003, an estimated end time display field 15004, and a progress status display field 15010.

The file search term input field 15001 is a field for a user to input a file search term. At this point in the present embodiment, when a progress status display request has been received, the progress display process illustrated in FIG. 8 and the entire process end time calculation process illustrated in FIG. 9 and FIG. 10 may be executed. The file registration completion ratio display field 15002 is a field configured to display the file registration completion ratio calculated in the process of Step 7005. The yet to be processed file number display field 15003 displays the number of global file ID not satisfying the termination condition. The estimated end time display field 15004 is a field configured to display the estimated end time calculated in the process of Step 8005 illustrated in FIG. 9.

The progress status display field 15010 includes a file name 15011 and a status 15012. The file name 15011 displays the file name of the file matching the file search term. The status 15012 displays information operable to identify whether a file identified by the file name is a file satisfying the termination condition (usable file) or a file not satisfying the termination condition (file whose registration is ongoing).

When a priority registration button 15013 is operated, the file of the record corresponding to the button will be designated as a file whose priority will be modified.

By the above, when a user wishes to use a particular file urgently, by modifying the priority of the file, the process for the file will be executed with priority.

Third Embodiment

Hereinafter, a third embodiment of the present invention will be described with reference to FIG. 17.

In the first and second embodiments, each process unit collects files from acquisition sources of the files and executes processes with respect to the files, in the third embodiment, however, an external system (registration batch system 1600 illustrated in FIG. 17) connected per each process unit controls the file collection by each process unit and the process execution on files by each process unit, and controls the progress status of the processes executed by each process unit, wherein the progress management system 100 collects the progress information from the registration batch system 1600.

Figure 17:
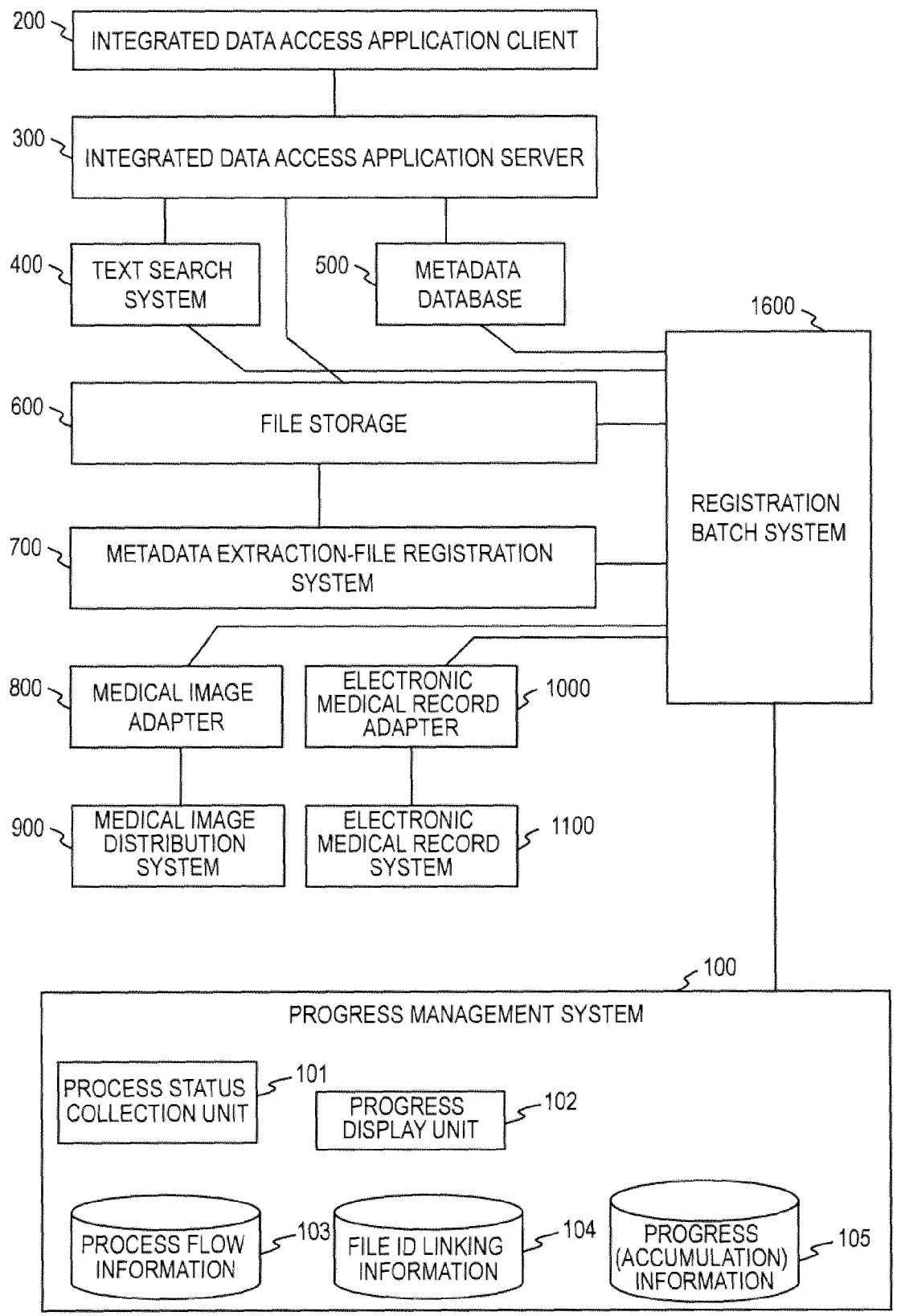
FIG. 17 is an explanatory diagram of a configuration of an information process system according to a third embodiment of the present invention.

FIG. 17 is an explanatory diagram of a configuration of an information process system according to the third embodiment of the present invention.

The registration batch system 1600 is, as stated above, a system configured to control the file collection by each process unit and the execution of file processing by each process unit. The registration batch system 1600 executes a registration batch program and includes a progress information API. The registration batch program is configured in advance with an order of processes to be executed by each process unit in order for the system managed by the progress management system 100 to execute its series of processes. The progress information API does not need to be arranged at each process unit according to the present embodiment.

The process flow information 103 stored at the progress management system 100 is registered with an order of processes to be executed by each process unit set in the registration batch program. Further, the progress status collection unit 101 of the progress management system 100 accesses the progress information API of the registration batch system, instead of collecting the progress information from each process unit, in order to collect the progress information of each process unit.

Note that since other processes executed by the progress management system 100 are the same as those in the first embodiment, the description thereof will be omitted. Further, it goes without saying the present embodiment is applicable to the second embodiment.

According to the present embodiment, even when the registration batch system 1600 arranged externally from the system managed by the progress management system 100 controls the execution of processes to files by each process unit, the first embodiment and the second embodiment are applicable.

Fourth Embodiment

Hereinafter, a fourth embodiment of the present invention will be described with reference to FIG. 18 and FIG. 19.

In the first to third embodiments, a configuration of a system managed by the progress management system 100 in which each process unit is arranged physically close to one another and connected to one another via a network has been assumed. However, it is possible that a system having the same configuration might need to be arranged at multiple data centers due to and in accordance with geographical conditions of an end user or the storage capacity of the file storage 600, or the like (see FIG. 18). In the present embodiment, the progress management system 100 executes a file movement process which is a process to move files between data centers when a data center A includes a group of files that satisfy a particular condition while data center B includes another group of files.

Figure 18:
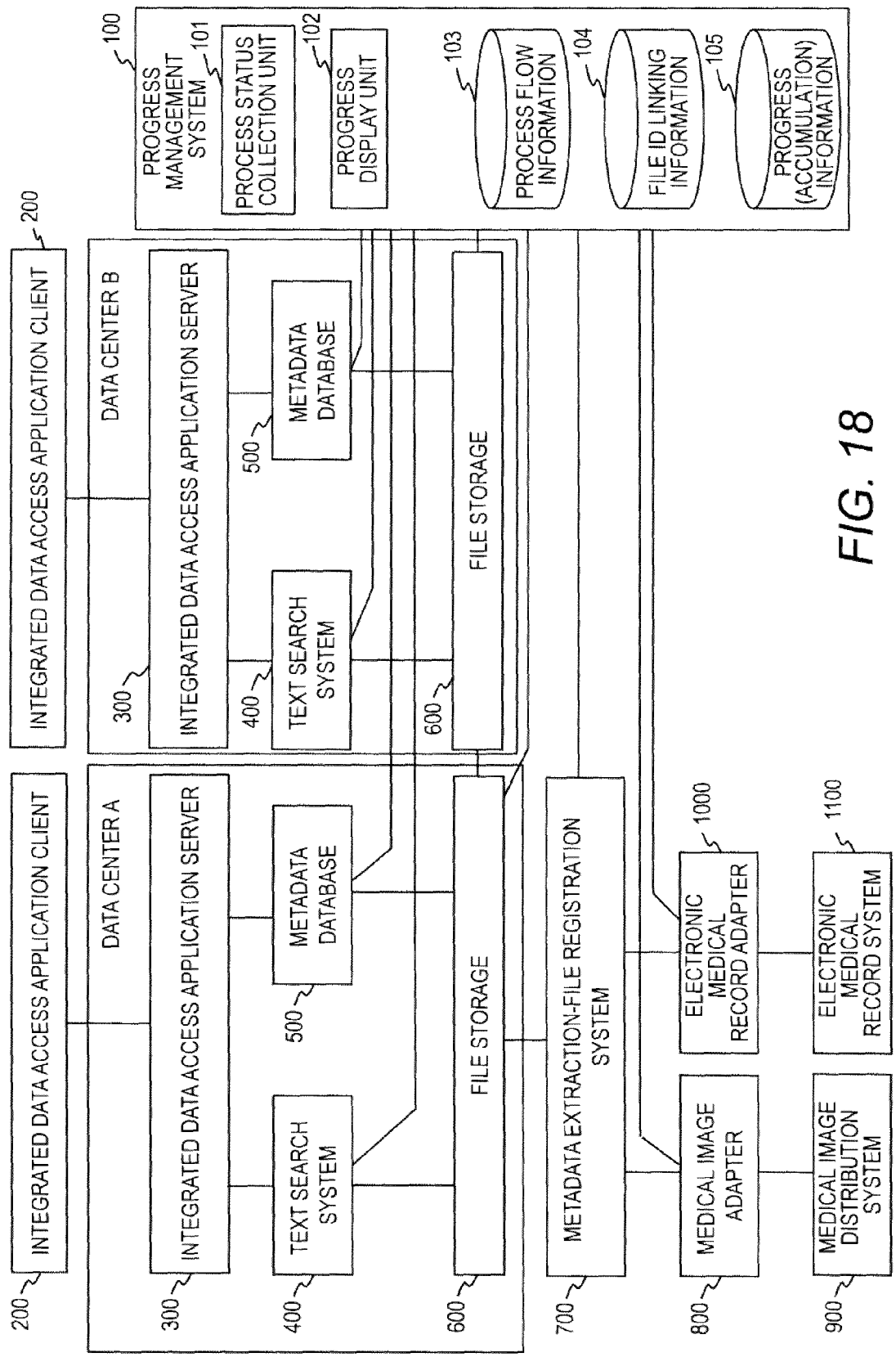
FIG. 18 is an explanatory diagram of a configuration of an information process system according to a fourth embodiment of the present invention.

FIG. 18 is an explanatory diagram of a configuration of an information process system according to the fourth embodiment of the present invention. Note among the elements in the information process system illustrated in FIG. 18 those corresponding to the elements in the information process system illustrated in FIG. 1 will be designated by the same reference numerals as those in FIG. 1 and the description thereof will be omitted.

According to FIG. 18, the data center A includes the integrated data access application server 300, the test search system 400, the metadata database 500, and the file storage 600. Further, the data center B includes the integrated data access application server 300, the test search system 400, the metadata database 500, and the file storage 600.

The file storage 600 arranged at the data center A is connected to the metadata extraction—file registration system 700. Further, the file storage 600 arranged at the data center B is, instead of being connected to the metadata extraction—file registration system 700, connected to the file storage 600 arranged at the data center A.

By such configuration, the files which are collected by the medical record adapter 800 and the electronic medical record adapter 1000 will be registered at the file storage 600 arranged at the data center A via the metadata extraction—file registration system 700. Then, the progress management system 100 moves, out of the files that are registered at the file storage 600 arranged at the data center A, the file satisfying a predetermined condition (e.g., conditions designated by a user) to the file storage 600 arranged at the data center B.

Figure 19:
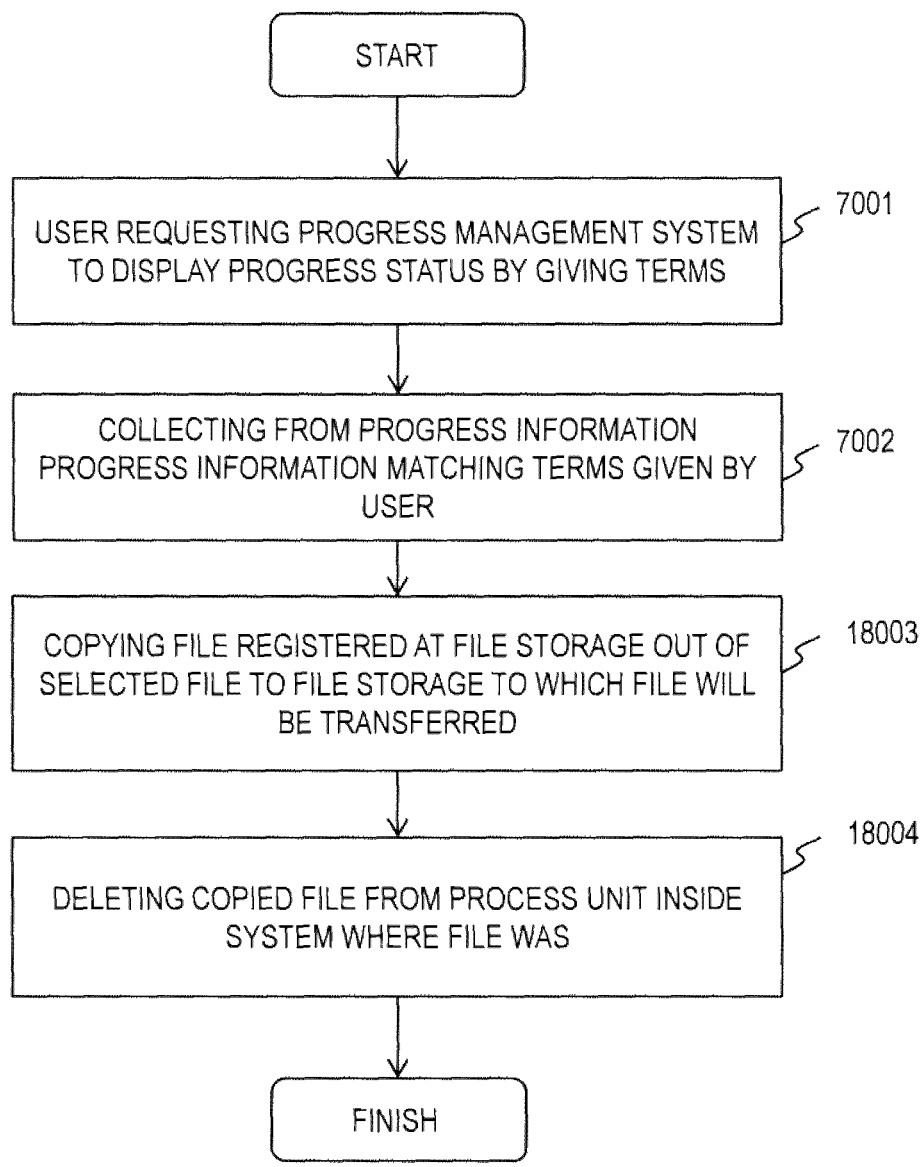
FIG. 19 is a flowchart of a file transfer process according to the fourth embodiment of the present invention.

FIG. 19 is a flowchart of the file movement process according to the fourth embodiment of the present invention. The file movement process is executed by the CPU 111 of the progress management system 100. Note since the processes of Steps 7001 and 7002 illustrated in FIG. 19 are the same as the processes of Steps 7001 and 7002 illustrated in FIG. 8, those processes in FIG. 19 will be designated by the same reference numerals as those in FIG. 8 and the description thereof will be omitted.

In the process of Step 7001, the file search term inputted by a user includes a condition to search for a file which will be moved.

In the process of Step 7002, after the records that match the file search term have been collected from the progress accumulation information 105, the progress display unit 102 identifies the file whose registration at the file storage 600 arranged at the data center A has been completed from the collected progress accumulation information 105, and copies the identified file from the file storage 600 arranged at the data center A to the file storage 600 arranged at the data center B (18003). To be more specific, the progress display unit 102 identifies a record in which the identification information of the metadata extraction—file registration system 700 is registered at the component ID 6002 out of the records of the progress accumulation information 105 collected in the process of Step 7002. Then, the progress display unit 102 identifies the global file ID registered at the global file ID 6001 of the identified record whose status 6003 indicates "registration complete" as the identification information of the file whose registration at the file storage 600 arranged at the data center A has been completed. Then, the progress display unit 102 transmits a copy instruction instructing to the file storage 600 arranged at the data center A to copy the file to file storage 600 arranged at the data center B.

Next, the progress display unit 102 deletes the file which was copied to the file storage 600 arranged at the data center B from each process unit arranged at the data center A (the test search system 400 and the metadata database 500) and the file storage 600 arranged at the data center A (18004), and ends the process. Note each process unit includes a deletion interface (not depicted) configured to execute the deletion process of files. The progress display unit 102 deletes files from each process unit by transmitting a deletion request to the deletion interface of each process unit arranged at the data center A. By the above, the progress display unit 102 is operable to move, out of the files registered at the file storage 600 arranged at the data center A, the files designated by a user to the file storage 600 arranged at the data center B.

Note that while the progress display unit 102 executes the file movement process and the file deletion process according to the present embodiment, a program other than the progress display unit 102 may execute these processes.

The progress management system 100 is operable to collect the progress status of the file copy process of Step 18003 and the file deletion process of Step 18004 from the file storage 600 and/or the registration batch system 1600 by using the same method as in the first embodiment and the third embodiment of the present invention.

According to the present embodiment, even when each data center registers therein different files from one another due to reasons such as geological conditions, or the like, of users, the progress management system 100 is operable control the movement of files within the system managed by the progress management system 100 in a systematic manner. Further, by combining the first embodiment and the third embodiment with the present embodiment, the progress management system 100 is operable to manage the progress status of the file movement process and the file deletion process.

Fifth Embodiment

The progress management system 100 according to the first through fourth embodiments collects the progress information of each process unit in a periodical manner so as to, upon receiving the progress status display request via the process of 7001, calculate the progress status based on the progress information satisfying the condition of the request. According to the present embodiment, the progress management system 100 collects the progress information of each process unit when the progress status display request is received, and calculates the progress status based on the progress information satisfying the condition of the request.

The progress management system 100 according to the present embodiment executes the processes of Steps 3001 through 13001 of the process status collection process illustrated in FIG. 4 when the progress status display request is received via the process of Step 7001 illustrated in FIG. 8, FIG. 9, and FIG. 12. By this, the progress management system 100 no longer needs to always retain the file ID linking information 104 and the progress accumulation information 105, but only when the progress status display request is received and when the progress status of the system managed by the progress management system 100 is to be calculated. Accordingly, the present embodiment is operable to realize the progress management system with reduced cost that is associated with data accumulation.

This invention is not limited to the embodiments described above and encompasses various modification examples. For instance, the embodiments given above are detailed descriptions intended for easier understanding of this invention, and this invention is not limited to a mode that has all of the components described above. To give another example, while one time slave is provided in one base in the time synchronization systems according to the embodiments described above, it should be understood that this invention is applicable also to a configuration in which one base is provided with a plurality of time slaves.

Some of or all of the components, functions, processing parts, processing measures, and the like described above may be implemented by hardware by for example, designing those in the form of an integrated circuit. Alternatively, the components, functions, and the like described above may be implemented by software by having a processor interpret and execute programs that respectively implement the above-mentioned functions. Programs, tables, files, and other types of information for implementing the above-mentioned functions can be put in a memory, a recording device such as a hard disk or a solid state drive (SSD), or a recording medium such as an IC card, an SD card, or a DVD.

INDUSTRIAL APPLICABILITY

The present invention is applicable to a progress management system for managing the progress status of a process executed by a management target system which includes multiple process units and which executes a series of processes to a file.

What is claimed is:

1. A progress status management system comprising a management target system configured to execute a series of processes to a file, which includes a plurality of process units configured to execute a process to the file, and a progress status management unit configured to manage a progress status of a process executed by the process unit included at the management target system, wherein the progress status management system stores process flow information registering therein a process order of the process units to execute a process to the file, wherein the progress status management unit includes:

an identification information linking unit configured to link first identification information, which is identification information of the file in the process unit, and second identification information, which is identification information of the file unique in the management target system, and store the linked identification information as identification information linking information;

a progress information collection unit configured to collect progress information including a progress status of a process executed by the process unit and the first identification information of the processed file in the process unit executing the process; and a progress status linking unit configured to refer to the identification information linking information, identify the second identification information linked to the first identification information of progress information collected by the progress information collection unit, link the identified second identification information to a progress status of the progress information collected by the progress information collection unit, and store the second identification information and the linked progress status as progress accumulation information, wherein the plurality of process units include a first process unit and a second process unit, wherein the identification information linking unit, in a case of acquiring the first identification information of the file in the first process unit, acquires the first identification information of the file in the second process unit, and wherein the identification information linking unit links the acquired first identification information in the first process unit and the acquired first identification information in the second process unit to the same second identification information.

2. The progress status management system according to claim 1 comprising a progress status calculation unit configured to calculate, based on the progress accumulation information, stored by the progress status linking unit, a progress status of a process executed to the file by the management target system.

3. The progress status management system according to claim 2, wherein the progress status calculation unit is configured to:

calculate, based on the progress accumulation information stored by the progress status linking unit, a number of the file to be processed by the management target system as a number of entire file;

calculate, based on the progress accumulation information stored by the progress status linking unit, a number of the file whose progress status of a process executed by a process unit configured to execute a last process of a series of processes to be executed thereto by the management target system indicates the process being completed as a number of a process end file; and calculate, by dividing the calculated process end file number by the calculated entire file number, a progress status of the entire management target system.

4. The progress status management system according to claim 2, wherein the each process unit calculates, in a case of completing a process to the file, an average of a completion time for executing the process to the file, wherein the progress status calculation unit is configured to:

calculate, based on the progress accumulation information stored by the progress status linking unit, a remaining number of the file scheduled to be processed for each process unit; and calculate, by multiplying the calculated remaining number of the file scheduled to be processed by the average of a completion time, an estimated end time for each process unit.

5. The progress status management system according to claim 4, wherein the progress status calculation unit calculates, based on the estimated end time for each process unit and the process order registered at the process flow information, an estimated end time for the entire management target system.

6. The progress status management system according to claim 1, wherein the progress status management system comprises a priority modification unit configured to identify, based on the progress accumulation information stored by the progress status linking unit, the identified file whose progress status indicates a last process of a series of processes to be executed thereto by the management target system remains incomplete, and modify priority of the file, out of the identified file, designated by a user, and wherein the process unit executes a process in an order of priority.

7. The progress status management system according to claim 1, wherein the progress status management system comprises a first storage area and a second storage area which are able to store the file, wherein the process unit includes a storage process unit configured to store the file at the first storage area, and wherein the progress status management system comprises a file movement unit configured to move the file satisfying a predetermined condition and whose progress status of the storage process unit indicates complete to the second storage area, and delete from the first storage area the file moved to the second storage area.

8. A progress status management method of a progress status management system including a management target system configured to execute a series of processes to a file, which includes a plurality of process units configured to execute a process to the file, and a progress status management unit configured to manage a progress status of a process executed by the process unit included at the management target system for managing a progress status, wherein the progress status management unit stores process flow information registering therein a process order of each process unit to execute a process to the file, wherein the method includes:

a first step for linking first identification information, which is identification information of the file in the process unit, and second identification information, which is identification information of the file unique in the management target system, and storing as identification information linking information;

a second step for collecting progress information including a progress status of a process executed by the process unit and the first identification information of the processed file in the process unit executing the process; and a third step for referring to the identification information linking information, identifying the second identification information linked to the first identification information of progress information collected in the second step, linking the identified second identification information to a progress status of the progress information collected in the second step, and storing the second identification information and the linked progress status as progress accumulation information, wherein the plurality of process units include a first process unit and a second process unit, wherein the third step includes:

a step for acquiring, in a case of acquiring the first identification information of the file in the first process unit, the first identification information of the file in the second process unit; and a step for linking the acquired first identification information in the first process unit and the acquired first identification information in the second process unit to the same second identification information.

9. The progress status management method according to claim 8 including a fourth step for calculating, based on the progress accumulation information stored in the third step, a progress status of a process executed to the file by the management target system.

10. The progress status management method according to claim 9, wherein the fourth step includes:

calculating, based on the progress accumulation information stored in the third step, a number of the file to be processed by the management target system as a number of entire file;

calculating, based on the progress accumulation information stored in the third step, a number of the file whose progress status of a process executed by a process unit configured to execute a last process of a series of processes to be executed thereto by the management target system indicates the process being completed as a number of process end file; and calculating, by dividing the calculated process end file number by the calculated entire file number, a progress status of the entire management target system.

11. The progress status management method according to claim 9, wherein the method includes:

calculating, by each process unit, in a case of completing a process to the file, an average of a completion time for executing the process to the file, wherein the fourth includes:

calculating, based on the progress accumulation information stored in the third step, a remaining number of the file scheduled to be processed for each process unit; and calculating, by multiplying the calculated remaining number of the file scheduled to be processed by the average of a completion time, an estimated end time for each process unit.

12. The progress status management method according to claim 11 including, calculating, by the fourth step, based on the estimated end time for each process unit and the process order registered at the process flow information, an estimated end time for the entire management target system.

13. The progress status management method according to claim 8, wherein the method includes:

a fifth step for identifying, based on the progress accumulation information stored in the third step, the file whose progress status indicates a last process of a series of processes to be executed thereto by the management target system remains incomplete, and modifying priority of the file, out of the identified file, designated by a user; and executing, by the process unit, a process in an order of priority.

14. The progress status management method according to claim 8, wherein the progress status management system includes a first storage area and a second storage which are able to store the file, wherein the process unit includes a storage process unit configured to store the file at the first storage area, the method includes a six step for moving the file satisfying a predetermined condition and a file whose progress status of the storage process unit indicates complete to the second storage area, and deleting from the first storage area the file transferred to the second storage area.

* * * * *